US012530284B2

(12) United States Patent
Whiteside et al.

(10) Patent No.: US 12,530,284 B2
(45) Date of Patent: Jan. 20, 2026

(54) TEST VISUALISATION TOOL

(71) Applicant: Five AI Limited, Cambridge (GB)

(72) Inventors: Iain Whiteside, Cambridge (GB); Marco Ferri, Cambridge (GB); Ben Graves, Cambridge (GB); Jamie Cruickshank, Cambridge (GB)

(73) Assignee: Five AI Limited, Cambridge (GB)

( * ) Notice: Subject to any disclaimer, the term of this patent is extended or adjusted under 35 U.S.C. 154(b) by 124 days.

(21) Appl. No.: 18/568,188

(22) PCT Filed: Jun. 8, 2022

(86) PCT No.: PCT/EP2022/065484
§ 371 (c)(1),
(2) Date: Dec. 7, 2023

(87) PCT Pub. No.: WO2022/258657
PCT Pub. Date: Dec. 15, 2022

(65) Prior Publication Data
US 2025/0123952 A1    Apr. 17, 2025

(30) Foreign Application Priority Data

Jun. 8, 2021    (GB) ..................................... 2108182
Jun. 22, 2021   (GB) ..................................... 2108952
(Continued)

(51) Int. Cl.
*G06F 9/44*       (2018.01)
*G06F 11/3668*    (2025.01)
(Continued)

(52) U.S. Cl.
CPC ...... *G06F 11/3696* (2013.01); *G06F 11/3698* (2025.01); *G06N 3/006* (2013.01); *G07C 5/008* (2013.01); *G07C 5/02* (2013.01)

(58) Field of Classification Search
CPC . G06F 11/3696; G06F 11/3698; G06N 3/006; G07C 5/008; G07C 5/02
See application file for complete search history.

(56) References Cited

U.S. PATENT DOCUMENTS 10,394,704 B2 *   8/2019   Wiechowski ....... G06F 11/3698
2020/0409829 A1 * 12/2020  Bedi ................... G06F 11/3684
(Continued)

FOREIGN PATENT DOCUMENTS

CN    108844754 A    11/2018
EP      3789920 A1    3/2021
(Continued)

OTHER PUBLICATIONS

International Search Report and Written Opinion from the International Searching Authority from related PCT Application No. PCT/EP2022/065509, dated Jan. 11, 2023, (22 pages).
(Continued)

*Primary Examiner* — Qamrun Nahar
(74) *Attorney, Agent, or Firm* — Andrew J. Tibbetts; Samuel S. Stone; Greenberg Traurig, LLP

(57) ABSTRACT

A computer system for rendering a graphical user interface for visualising runs of a driving scenario in which an ego agent navigates a road layout, comprising an input configured to receive a map of the road layout and run data comprising a sequence of timestamped ego agent states and a time-varying numerical score quantifying the performance of the ego agent with respect to a set of run evaluation rules; and a rendering component configured to cause a graphical user interface to display, for each rule: a plot of the time-varying numerical score, and a marker denoting a selected time index of the plot, the marker movable along the time axis to change the selected time index; and a scenario visualization comprising a visualization of the run at the selected time index, whereby moving the marker along the
(Continued)

time axis causes the scenario visualisation to update as the time index is changed.

20 Claims, 20 Drawing Sheets

(30) Foreign Application Priority Data

| | | |
|---|---|---|
| Jun. 22, 2021 | (GB) | 2108958 |
| Aug. 17, 2021 | (GB) | 2111765 |
| Apr. 1, 2022 | (GB) | 2204797 |

(51) Int. Cl.
| | |
|---|---|
| *G06F 11/3698* | (2025.01) |
| *G06N 3/006* | (2023.01) |
| *G07C 5/00* | (2006.01) |
| *G07C 5/02* | (2006.01) |

(56) References Cited

U.S. PATENT DOCUMENTS

| | | | |
|---|---|---|---|
| 2021/0089433 A1* | 3/2021 | Mattar | G06F 11/3676 |
| 2021/0094540 A1* | 4/2021 | Bagschik | G06F 11/3688 |
| 2024/0338273 A1* | 10/2024 | Philip | G06F 11/3688 |

FOREIGN PATENT DOCUMENTS

| | | |
|---|---|---|
| JP | H11-125584 A | 5/1999 |
| JP | 2017-174244 A | 9/2017 |
| JP | 2018-079732 A | 5/2018 |
| JP | 2019-512824 A | 5/2019 |
| JP | 2019-527813 A | 10/2019 |
| JP | 2020-042014 A | 3/2020 |
| JP | 2020-123259 A | 8/2020 |
| JP | 2021-019275 A | 2/2021 |
| WO | 2017/165286 A1 | 9/2017 |
| WO | 2018/232680 A1 | 12/2018 |
| WO | 2021/065559 A1 | 4/2021 |
| WO | 20210245200 A1 | 12/2021 |
| WO | 20210245201 A1 | 12/2021 |
| WO | 20220171819 A1 | 8/2022 |

OTHER PUBLICATIONS

Mitra Pallavi et al: "Towards Modeling of Perception Errors in Autonomous Vehicles", 2018 21st: International Conference on Intelligent Transportation Systems (ITSC), IEEE, Nov. 4, 2018 (Nov. 4, 2018), pp. 3024-3029.
International Search Report and Written Opinion from the International Searching Authority from related PCT Application No. PCT/EP2022/065487, dated Nov. 4, 2022, (14 pages).
Charles R. Qi , et al: Offboard 3D Object Detection from Point Cloud Sequences; Mar. 8, 2021 (18 pages).
Japanese Office Action date Nov. 22, 2024, from related Japanese Patent Application 2023-575621.
Japanese Office Action dated Dec. 6, 2024, from related Japanese Patent Application 2023-575617 (6 pages).
Japanese Office Action dated Jan. 31, 2025, from related Japanese Patent Application 2023-575619 (9 pages).
International Search Report, PCT/EP2022/065484 Date: Oct. 19, 2022 By: Authorized Officer: Bozas, Ioannis.
Msc Software., "Virtual Test Drive (VTD): Webinar-Leverage Simulation to Achieve Safety for Autonomous Vehicles," Jun. 10, 2019.
Vector., "Virtual Test Driving: Stimulation of ADAS Control Units Equivalent to Real Driving Tests," Apr. 29, 2020.

* cited by examiner

| Parameters | INSTANCES | |
|---|---|---|
| | 273186 | 273145 |
| $V_y$ | 1.6 | 1.6 |
| Rules | | |
| DR_01a<br>Ego shall not collide with any forward vehicle. | Fail | Pass |
| ALKS_05a<br>With a parameter of 0.5m/s | Pass | Pass |
| NO_UNPREV_CUTIN_COL<br>Do not collide with other road users if it can be avoided. Unavoidable collision may result from an aggressive cut-in. | Pass | Pass |
| ALKS_03<br>Ego reacts properly to a cut-in that breaches the minimum following distance by braking to keep velocity lower than cut-in agent. | Fail | Fail |
| DIR_01b<br>Ego shall not be backended of by another vehicle. | Pass | Pass |
| ALKS_05<br>Ego shall aim to keep the vehicle in a stable lateral position inside its lane of travel. | Pass | Fail |
| ALKS_02<br>Ego respects ALKS minimum following distance in the absence of cut-in or de | Pass | Pass |

| Parameters | 273186 | 273145 |
|---|---|---|
| Vy | 1.6 | 1.6 |
| Rules | | |
| DR_01a<br>Ego shall not collide with any forward vehicle. | Fail | Pass |
| ALKS_05a<br>With a parameter of 0.5m/s | Pass | Pass |
| NO_UNPREV_CUTIN_COL<br>Do not collide with other road users if it can be avoided. Unavoidable collision may result from an aggressive cut-in. | Pass | Pass |
| ALKS_03<br>Ego reacts properly to a cut-in that breaches the minimum following distance by braking to keep velocity lower than cut-in agent. | Fail | Fail |
| DIR_01b<br>Ego shall not be backended of by another vehicle. | Pass | Pass |
| ALKS_05<br>Ego shall aim to keep the vehicle in a stable lateral position inside its lane of travel. | Pass | Fail |
| ALKS_02<br>Ego respects ALKS minimum following distance in the absence of cut-in or decelerating lead vehicle | Pass | Pass |

FIG. 6

| Regression Charts | Regression Report | Progression Charts | Progression Report |

Progressive... [2022-01-28 ▼]

Summary Report 2022-01-28 (Comparision: 2022-01-27)

Test Result:     2022-01-28..     2022-01-27..

JCT_01a_Nightly_Regression    ***********************    -

JCT_02a_Nightly_Regression — 702    ********************* — 704    ********************* — 704

Rule: STAY_IN_LANE_7CTN — 706    712 — Improvements & Regressions : 1 — 708

Scenario Name : JCT_C2a_LF_TL_2ACT_Flow    553939 Result : FAIL ( 534233 Result: PASS ) Compare — 714

Scenario Name : JCT_C2a_LF_TL_2ACT_Flow    554631 Result : PASS ( 535311 Result: FAIL ) Compare Scenario Name : JCT_C2a_LF_TL_2ACT_Flow    555234 Result : PASS ( 536246 Result: FAIL ) Compare Scenario Name : JCT_C2a_LF_TL_2ACT_Flow    555334 Result : PASS ( 536395 Result: FAIL ) Compare Scenario Name : JCT_C2a_LF_TL_2ACT_Flow — 710    555934 Result : PASS ( 537043 Result: FAIL ) Compare Scenario Name : JCT_C2a_LF_TL_2ACT_Flow    556636 Result : PASS ( 537750 Result: FAIL ) Compare

FIG. 7

TEST VISUALISATION TOOL

CROSS-REFERENCE TO RELATED APPLICATIONS

This application is the U.S. National Stage application, pursuant to 35 U.S.C. § 371, of PCT International Patent Application No. PCT/EP2022/065484, filed Jun. 8, 2022, designating the United States and published in English, which claims priority under 35 U.S.C. §§ 119 and 365 to Great Britain Patent Application No. 2108182.3, filed Jun. 8, 2021, Great Britain Patent Application No. 2108952.9, filed Jun. 22, 2021, Great Britain Patent Application No. 2108958.6, filed Jun. 22, 2021, Great Britain Patent Application No. 2111765.0, filed Aug. 17, 2021, and Great Britain Patent Application No. 2204797.1, filed Apr. 1, 2022. The contents of each of the aforementioned applications are incorporated herein by reference in their entirety.

TECHNICAL FIELD

The present disclosure relates to computer systems and methods for visualising and evaluating mobile robot behaviour.

BACKGROUND

There have been major and rapid developments in the field of autonomous vehicles. An autonomous vehicle (AV) is a vehicle which is equipped with sensors and control systems which enable it to operate without a human controlling its behaviour. An autonomous vehicle is equipped with sensors which enable it to perceive its physical environment, such sensors including for example cameras, radar and lidar. Autonomous vehicles are equipped with suitably programmed computers which are capable of processing data received from the sensors and making safe and predictable decisions based on the context which has been perceived by the sensors. An autonomous vehicle may be fully autonomous (in that it is designed to operate with no human supervision or intervention, at least in certain circumstances) or semi-autonomous. Semi-autonomous systems require varying levels of human oversight and intervention, such systems including Advanced Driver Assist Systems and level three Autonomous Driving Systems. There are different facets to testing the behaviour of the sensors and control systems aboard a particular autonomous vehicle, or a type of autonomous vehicle. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

In autonomous driving, the importance of guaranteed safety has been recognized. Guaranteed safety does not necessarily imply zero accidents, but rather means guaranteeing that some minimum level of safety is met in defined circumstances. It is generally assumed this minimum level of safety must significantly exceed that of human drivers for autonomous driving to be viable.

Rule-based models may be used to test the performance of various aspects of autonomous vehicles in real-world driving scenarios as well as in simulation. These models provide standards that an autonomous vehicle stack should meet in order to be considered safe. A large number of real-world or simulated driving runs need to be evaluated to ensure that potentially dangerous scenarios are encountered in testing. Thus, large amounts of real or simulated driving data need to be processed in testing. The rules defined for the rule-based testing model are applied to each of the real or simulated driving scenarios to generate a set of test results, which can be complex and difficult for a user to interpret.

SUMMARY

The RSS model provides a rule-based model for testing behaviour of ego agents, thereby evaluating the planning and control of the autonomous vehicle stack. Other aspects of the autonomous vehicle's performance may also be tested using a rule-based model. For example, perception errors of a real or simulated autonomous vehicle stack are determined based on a perception ground truth (which may be a simulation ground truth or a 'pseudo' ground truth generated from real-world sensor data). A user can evaluate whether the perception outputs of the autonomous vehicle stack are within acceptable standards of accuracy by defining a set of perception error rules and evaluating the determined perception errors against these rules.

In rules-based testing of autonomous vehicle stacks, both in real-world driving scenarios and in simulation, the driving performance of the ego agent is evaluated against one or more defined rules. These rules could include driving rules that evaluate the behaviour of the ego agent based on some model of expected safe driving behaviour in similar driving scenarios, and/or perception rules, that evaluate the accuracy of the ego's perception of its surroundings. Many rules may be defined for each scenario, and it is important in testing for these rule evaluations to be interpretable by a user both for individual scenarios and in an aggregated set of results representing the performance of the ego agent for a large number of scenarios. One way to provide interpretable results on the scenario level is to provide a graphical user interface for displaying results for each given scenario instance (or 'run') of an ego agent driving in a given set of conditions (real or simulated). In one example graphical user interface a visualisation of the scenario is presented with a set of timelines for each rule indicating whether that rule was passed or failed during the run. This visualisation provides a useful summary to a user of the rules that passed and failed in a given run, providing an overall summary of the performance of the ego for that run. Rules may be definable by a user and/or may be arbitrarily complex. A numerical score may be provided for each rule in the user interface and multiple conditions may contribute to the rule and thus its numerical performance score. Whilst this flexibility is desired in order to accommodate the nuances of driving over a wide range of real/realistic driving runs, it can be difficult for a user to interpret the direct relationship of the rule evaluation to the events of the scenario, particularly with complex rules and/or rules based on multiple conditions. Interpretability of run evaluation rules in AV performance testing is one technical challenge addressed herein.

Described herein is a system for visualising driving runs for an ego agent that provides a visualisation of the scenario along with a set of time plots of a numerical performance of the ego agent based on a respective set of rules. The user is provided with a time marker for each of the scenario visualisation and the plots associated with each rule, allowing the user to select a given time in the scenario to visualise what occurred in the scenario at that time, and the time marker for each rule moves to the corresponding timesteps of the plot of the numerical performance of the ego for that rule, allowing the user to identify quickly how a rule failure corresponds to the actual events of the scenario. This enables a user to visualise the relationship between the defined rules and the ego agent behaviour and other conditions of the scenario at any given time in the driving run. This novel graphical user interface mechanism makes numerical performance scores more interpretable to a user, in whatever manner the underlying rules are defined.

A first aspect herein provides a computer system for rendering a graphical user interface for visualising runs of a driving scenario in which an ego agent navigates a road layout, the computer system comprising: at least one input configured to receive a map of the road layout of the driving scenario and run data of a run of the driving scenario, wherein the run data comprises: a sequence of timestamped ego agent states, a time-varying numerical score quantifying the performance of the ego agent with respect to each rule of a set of run evaluation rules, computed by applying the run evaluation rule to the run, and a rendering component configured to generate rendering data for causing a graphical user interface to display, for each rule of the run evaluation rules: a plot of the time-varying numerical score, and a marker denoting a selected time index on a time axis of the plot, the marker being movable along the time axis via user input at the graphical user interface to change the selected time index, and a scenario visualisation comprising a visualization of the road layout, overlaid with an agent visualization of the run at the selected time index, whereby moving the marker along the time axis causes the rendering component to update the scenario visualisation as the selected time index is changed.

The input may be further configured to receive second run data of a second run of the driving scenario, the second run data comprising a second sequence of timestamped ego agent states and a time-varying numerical score quantifying the performance of the ego agent with respect to each rule of a set of driving performance and/or perception rules, computed by applying the run evaluation rule to the run; and wherein the rendering component is further configured to generate rendering data for causing a graphical interface to display, for each rule of the set of driving performance and/or perception rules: a second plot of the time-varying numerical score of the second run, wherein the time-varying numerical scores of the run and the time-varying numerical scores of second run are plotted with respect to a common set of axes comprising at least a common time axis, wherein the marker denotes a selected time index on the common time axis, and a second agent visualisation of the second run at the selected time index, wherein the scenario visualisation is overlaid with the second agent visualisation.

When testing an ego agent in simulation or real-world driving scenarios, multiple runs may be evaluated for a single scenario where aspects of the agent's configuration or behaviour is different for each run. In this case, evaluation of rules and metrics for each run do not on their own provide a detailed picture of how the differences in the agent's configuration and/or behaviour affect the progress of the scenario. Described herein is a system comprising a run comparison user interface, in which two driving runs can be compared in a common scenario visualisation along a common time interval, where a user can interactively select a time index of the scenario, and the user interface displays a visualisation of the vehicle's state at that time for each of the two runs. This enables the comparison of the vehicle's behaviour over the two runs in a playback of the scenario, which allows the user to identify particular actions or features of each run that contribute to better or worse performance.

The time-varying numerical score may be computed by applying one or more rules to time-varying signals extracted from the run data, wherein changes in the signals are visible in the scenario visualisation.

The rendering component may be configured, responsive to a deselection input at the graphic user interface denoting one of the first and second runs, to, for each driving rule, remove the plot of the time-varying numerical score of the deselected run from the common set of axes, and remove the agent visualization of the deselected run from the single visualization of the road layout, whereby a user can switch from a run-comparison view pertaining to both of the first and second runs to a single-run view pertaining to only one of the first and second runs.

The graphical user interface may additionally include a comparison table having an entry for each rule of the set of run evaluation rules, the entry containing an aggregate performance result for that rule in the first run and an aggregate performance result for that rule in the second run.

The entry for each rule may additionally comprise a description of that rule.

The rendering component may be configured to, in response to an expansion input at the graphical user interface, hide the plot of the time-varying numerical scores for each rule and display a timeline view comprising an indication of a pass/fail result of the rule over time.

The rendering component may be configured to cause the graphical user interface to display, for each rule of the set of run evaluation rules, the numerical score at the selected time index.

The run evaluation rules may comprise perception rules, wherein the scenario visualisation comprises comprising a set of perception outputs generated by a perception component of the ego vehicle.

The scenario visualisation may comprise sensor data overlaid on the visualisation of the road layout.

The scenario visualisation may comprise a scenario time line having a scenario time marker, whereby moving the marker along the scenario time line causes the rendering component to update the respective time marker of each plot of the time-varying numerical score as the selected time index is changed.

The scenario time line may comprise a frame index corresponding to the selected time index and a set of controls to move forwards or backwards by respectively incrementing or decreasing the frame number.

The driving scenario may be a simulated driving scenario in which a simulated ego agent navigates a simulated road layout, and wherein the run data is received from a simulator.

The driving scenario may be a real-world driving scenario in which an ego agent navigates a real-world road layout, and wherein the run data is computed based on data generated on board the ego agent during the run.

The plot of the time-varying numerical score comprises an xy-plot of the time-varying numerical score.

Alternatively or additionally, the time-varying numerical score is plotted using colour coding.

A second aspect herein provides a method for visualising runs of a driving scenario in which an ego agent navigates a road layout, the method comprising: receiving a map of the road layout of the driving scenario and run data of a run of the driving scenario, wherein the run data comprises: a sequence of timestamped ego agent states, a time-varying numerical score quantifying the performance of the ego agent with respect to each rule of a set of run evaluation rules, computed by applying the run evaluation rule to the run, generate rendering data for causing a graphical user interface to display: for each rule of the run evaluation rules: a plot of the time-varying numerical score, and a marker denoting a selected time index on a time axis of the plot, the marker being movable along the time axis via user input at the graphical user interface to change the selected time index; and a scenario visualization comprising a visualization of the road layout, overlaid with an agent visualization of the run at the selected time index, whereby moving the marker along the time axis causes the rendering component to update the scenario visualisation as the selected time index is changed.

A further aspect herein provides a computer program comprising executable instructions for programming a computer system to implement the method or system functionality of any preceding claim.

BRIEF DESCRIPTION OF FIGURES

For a better understanding of the present disclosure, and to show how embodiments of the same may be carried into effect, reference is made by way of example only to the following figures in which:

FIG. 7 shows a regression report view of a run visualisation user interface.

DETAILED DESCRIPTION

Figure 1A:
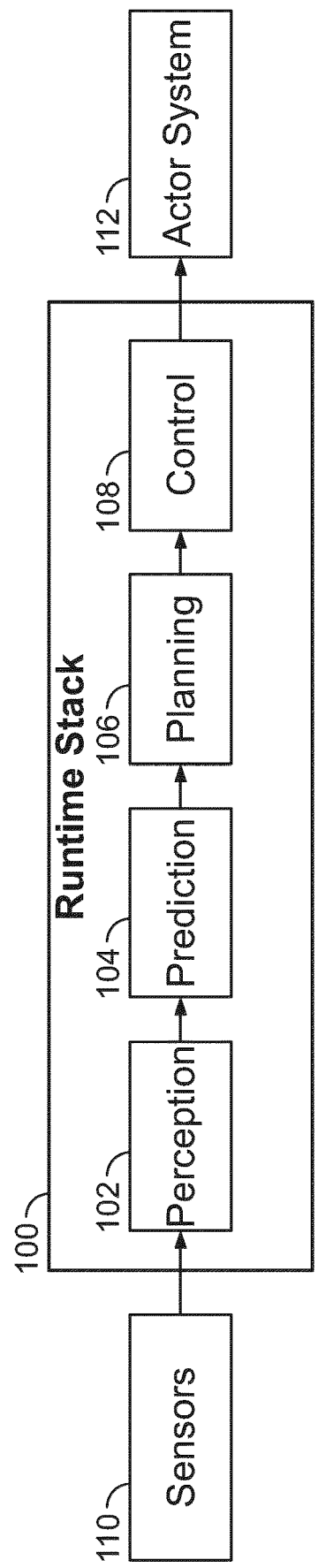
FIG. 1A shows a schematic block diagram of an autonomous vehicle stack.

In one example graphical user interface, disclosed in International Patent Application Nos. PCT/EP2022/053413, PCT/EP2022/053406 a visualisation of the scenario is presented with a set of timelines for each rule indicating whether that rule was passed or failed during the run. This visualisation provides a useful summary to a user of the rules that passed and failed in a given run, providing an overall summary of the performance of the ego for that run. However, rules are definable by a user and can be arbitrarily complex, as described later, with multiple conditions contributing to the numerical performance score provided in the user interface, making it difficult for a user to interpret the direct relationship of the rule evaluation to the events of the scenario.

The described embodiments provide a testing pipeline to facilitate rules-based testing of mobile robot stacks in real or simulated scenarios. A set of interactive graphical user interface (GUI) features increase the interpretability of the applied rules, allowing an expert to more easily and reliably assess stack performance in a given driving scenario from the GUI outputs.

A "full" stack typically involves everything from processing and interpretation of low-level sensor data (perception), feeding into primary higher-level functions such as prediction and planning, as well as control logic to generate suitable control signals to implement planning-level decisions (e.g. to control braking, steering, acceleration etc.). For autonomous vehicles, level 3 stacks include some logic to implement transition demands and level 4 stacks additionally include some logic for implementing minimum risk maneuvers. The stack may also implement secondary control functions e.g. of signalling, headlights, windscreen wipers etc.

The term "stack" can also refer to individual sub-systems (sub-stacks) of the full stack, such as perception, prediction, planning or control stacks, which may be tested individually or in any desired combination. A stack can refer purely to software, i.e. one or more computer programs that can be executed on one or more general-purpose computer processors.

The testing framework described below provides a pipeline for generating scenario ground truth from real-world data. This ground truth may be used as a basis for perception testing, by comparing the generated ground truth with the perception outputs of the perception stack being tested, as well as assessing driving behaviour against driving rules.

Agent (actor) behaviour in real or simulated scenarios is evaluated by a test oracle based on defined performance evaluation rules. Such rules may evaluate different facets of safety. For example, a safety rule set may be defined to assess the performance of the stack against a particular safety standard, regulation or safety model (such as RSS), or bespoke rule sets may be defined for testing any aspect of performance. The testing pipeline is not limited in its application to safety, and can be used to test any aspects of performance, such as comfort or progress towards some defined goal. A rule editor allows performance evaluation rules to be defined or modified and passed to the test oracle.

Similarly, vehicle perception can be assessed/evaluated by a 'perception oracle' based on defined perception rules. These may be defined within a perception error specification which provides a standard format for defining errors in perception.

Defining rules in a perception error framework allows areas of interest in a real-world driving scenario to be highlighted to a user, for example by flagging these areas in a replay of the scenario presented in a user interface, as described in more detail below. This enables the user to review an apparent error in the perception stack, and identify possible reasons for the error, for example occlusion in the original sensor data. The evaluation of perception errors in this way also allows for a 'contract' to be defined between perception and planning components of an AV stack, wherein requirements for perception performance can be specified, and where the stack meeting these requirements for perception performance commits to being able to plan safely. A unified framework may be used to evaluate real perception errors from real-world driving scenarios as well as simulated errors, either directly simulated using a perception error model, or computed by applying a perceptions stack to simulated sensor data, for example photorealistic simulation of camera images.

The ground truth determined by the pipeline can itself be evaluated within the same perception error specification by comparing it according to the defined rules against a 'true' ground truth determined by manually reviewing and annotating the scenario. Finally, the results of applying a perception error testing framework can be used to guide testing strategies to test both perception and prediction subsystems of the stack.

Whether real or simulated, a scenario requires an ego agent to navigate a real or modelled physical context. The ego agent is a real or simulated mobile robot that moves under the control of the stack under testing. The physical context includes static and/or dynamic element(s) that the stack under testing is required to respond to effectively. For example, the mobile robot may be a fully or semi-autonomous vehicle under the control of the stack (the ego vehicle). The physical context may comprise a static road layout and a given set of environmental conditions (e.g. weather, time of day, lighting conditions, humidity, pollution/particulate level etc.) that could be maintained or varied as the scenario progresses. An interactive scenario additionally includes one or more other agents ("external" agent(s), e.g. other vehicles, pedestrians, cyclists, animals etc.).

The following examples consider applications to autonomous vehicle testing. However, the principles apply equally to other forms of mobile robot.

Scenarios may be represented or defined at different levels of abstraction. More abstracted scenarios accommodate a greater degree of variation. For example, a "cut-in scenario" or a "lane change scenario" are examples of highly abstracted scenarios, characterized by a maneuver or behaviour of interest, that accommodate many variations (e.g. different agent starting locations and speeds, road layout, environmental conditions etc.). A "scenario run" refers to a concrete occurrence of an agent(s) navigating a physical context, optionally in the presence of one or more other agents. For example, multiple runs of a cut-in or lane change scenario could be performed (in the real-world and/or in a simulator) with different agent parameters (e.g. starting location, speed etc.), different road layouts, different environmental conditions, and/or different stack configurations etc. The terms "run" and "instance" are used interchangeably in this context.

In the following examples, the performance of the stack is assessed, at least in part, by evaluating the behaviour of the ego agent in the test oracle against a given set of performance evaluation rules, over the course of one or more runs. The rules are applied to "ground truth" of the (or each) scenario run which, in general, simply means an appropriate representation of the scenario run (including the behaviour of the ego agent) that is taken as authoritative for the purpose of testing. Ground truth is inherent to simulation; a simulator computes a sequence of scenario states, which is, by definition, a perfect, authoritative representation of the simulated scenario run. In a real-world scenario run, a "perfect" representation of the scenario run does not exist in the same sense; nevertheless, suitably informative ground truth can be obtained in numerous ways, e.g. based on manual annotation of on-board sensor data, automated/semi-automated annotation of such data (e.g. using offline/non-real time processing), and/or using external information sources (such as external sensors, maps etc.) etc.

The scenario ground truth typically includes a "trace" of the ego agent and any other (salient) agent(s) as applicable. A trace is a history of an agent's location and motion over the course of a scenario. There are many ways a trace can be represented. Trace data will typically include spatial and motion data of an agent within the environment. An agent trace comprising a sequence of timestamped agent states for each agent is provided to allow the state of the agent(s) to be visualized at different time steps. The term is used in relation to both real scenarios (with real-world traces) and simulated scenarios (with simulated traces). The trace typically records an actual trajectory realized by the agent in the scenario. With regards to terminology, a "trace" and a "trajectory" may contain the same or similar types of information (such as a series of spatial and motion states over time). The term trajectory is generally favoured in the context of planning (and can refer to future/predicted trajectories), whereas the term trace is generally favoured in relation to past behaviour in the context of testing/evaluation.

In a simulation context, a "scenario description" is provided to a simulator as input. For example, a scenario description may be encoded using a scenario description language (SDL), or in any other form that can be consumed by a simulator. A scenario description is typically a more abstract representation of a scenario, that can give rise to multiple simulated runs. Depending on the implementation, a scenario description may have one or more configurable parameters that can be varied to increase the degree of possible variation. The degree of abstraction and parameterization is a design choice. For example, a scenario description may encode a fixed layout, with parameterized environmental conditions (such as weather, lighting etc.). Further abstraction is possible, however, e.g. with configurable road parameter(s) (such as road curvature, lane configuration etc.). The input to the simulator comprises the scenario description together with a chosen set of parameter value(s) (as applicable). The latter may be referred to as a parameterization of the scenario. The configurable parameter(s) define a parameter space (also referred to as the scenario space), and the parameterization corresponds to a point in the parameter space. In this context, a "scenario instance" may refer to an instantiation of a scenario in a simulator based on a scenario description and (if applicable) a chosen parameterization.

For conciseness, the term scenario may also be used to refer to a scenario run, as well a scenario in the more abstracted sense. The meaning of the term scenario will be clear from the context in which it is used.

Example AV Stack:

To provide relevant context to the described embodiments, further details of an example form of AV stack will now be described.

FIG. 1A shows a highly schematic block diagram of an AV runtime stack 100. The run time stack 100 is shown to comprise a perception (sub-)system 102, a prediction (sub-)system 104, a planning (sub-)system (planner) 106 and a control (sub-)system (controller) 108. As noted, the term (sub-)stack may also be used to describe the aforementioned components 102-108.

In a real-world context, the perception system 102 receives sensor outputs from an on-board sensor system 110 of the AV, and uses those sensor outputs to detect external agents and measure their physical state, such as their position, velocity, acceleration etc. The on-board sensor system 110 can take different forms but generally comprises a variety of sensors such as image capture devices (cameras/optical sensors), lidar and/or radar unit(s), satellite-positioning sensor(s) (GPS etc.), motion/inertial sensor(s) (accelerometers, gyroscopes etc.) etc. The onboard sensor system 110 thus provides rich sensor data from which it is possible to extract detailed information about the surrounding environment, and the state of the AV and any external actors (vehicles, pedestrians, cyclists etc.) within that environment. The sensor outputs typically comprise sensor data of multiple sensor modalities such as stereo images from one or more stereo optical sensors, lidar, radar etc. Sensor data of multiple sensor modalities may be combined using filters, fusion components etc.

The perception system 102 typically comprises multiple perception components which co-operate to interpret the sensor outputs and thereby provide perception outputs to the prediction system 104.

In a simulation context, depending on the nature of the testing—and depending, in particular, on where the stack 100 is "sliced" for the purpose of testing (see below)—it may or may not be necessary to model the on-board sensor system 100. With higher-level slicing, simulated sensor data is not required therefore complex sensor modelling is not required.

The perception outputs from the perception system 102 are used by the prediction system 104 to predict future behaviour of external actors (agents), such as other vehicles in the vicinity of the AV.

Predictions computed by the prediction system 104 are provided to the planner 106, which uses the predictions to make autonomous driving decisions to be executed by the AV in a given driving scenario. The inputs received by the planner 106 would typically indicate a drivable area and would also capture predicted movements of any external agents (obstacles, from the AV's perspective) within the drivable area. The driveable area can be determined using perception outputs from the perception system 102 in combination with map information, such as an HD (high definition) map.

A core function of the planner 106 is the planning of trajectories for the AV (ego trajectories), taking into account predicted agent motion. This may be referred to as trajectory planning. A trajectory is planned in order to carry out a desired goal within a scenario. The goal could for example be to enter a roundabout and leave it at a desired exit; to overtake a vehicle in front; or to stay in a current lane at a target speed (lane following). The goal may, for example, be determined by an autonomous route planner (not shown).

The controller 108 executes the decisions taken by the planner 106 by providing suitable control signals to an on-board actor system 112 of the AV. In particular, the planner 106 plans trajectories for the AV and the controller 108 generates control signals to implement the planned trajectories. Typically, the planner 106 will plan into the future, such that a planned trajectory may only be partially implemented at the control level before a new trajectory is planned by the planner 106. The actor system 112 includes "primary" vehicle systems, such as braking, acceleration and steering systems, as well as secondary systems (e.g. signalling, wipers, headlights etc.).

Note, there may be a distinction between a planned trajectory at a given time instant, and the actual trajectory followed by the ego agent. Planning systems typically operate over a sequence of planning steps, updating the planned trajectory at each planning step to account for any changes in the scenario since the previous planning step (or, more precisely, any changes that deviate from the predicted changes). The planning system 106 may reason into the future, such that the planned trajectory at each planning step extends beyond the next planning step. Any individual planned trajectory may, therefore, not be fully realized (if the planning system 106 is tested in isolation, in simulation, the ego agent may simply follow the planned trajectory exactly up to the next planning step; however, as noted, in other real and simulation contexts, the planned trajectory may not be followed exactly up to the next planning step, as the behaviour of the ego agent could be influenced by other factors, such as the operation of the control system 108 and the real or modelled dynamics of the ego vehicle). In many testing contexts, the actual trajectory of the ego agent is what ultimately matters; in particular, whether the actual trajectory is safe, as well as other factors such as comfort and progress. However, the rules-based testing approach herein can also be applied to planned trajectories (even if those planned trajectories are not fully or exactly realized by the ego agent). For example, even if the actual trajectory of an agent is deemed safe according to a given set of safety rules, it might be that an instantaneous planned trajectory was unsafe; the fact that the planner 106 was considering an unsafe course of action may be revealing, even if it did not lead to unsafe agent behaviour in the scenario. Instantaneous planned trajectories constitute one form of internal state that can be usefully evaluated, in addition to actual agent behaviour in the simulation. Other forms of internal stack state can be similarly evaluated.

The example of FIG. 1A considers a relatively "modular" architecture, with separable perception, prediction, planning and control systems 102-108. The sub-stacks themselves may also be modular, e.g. with separable planning modules within the planning system 106. For example, the planning system 106 may comprise multiple trajectory planning modules that can be applied in different physical contexts (e.g. simple lane driving vs. complex junctions or roundabouts). This is relevant to simulation testing for the reasons noted above, as it allows components (such as the planning system 106 or individual planning modules thereof) to be tested individually or in different combinations. For the avoidance of doubt, with modular stack architectures, the term stack can refer not only to the full stack but to any individual sub-system or module thereof.

The extent to which the various stack functions are integrated or separable can vary significantly between different stack implementations—in some stacks, certain aspects may be so tightly coupled as to be indistinguishable. For example, in other stacks, planning and control may be integrated (e.g. such stacks could plan in terms of control signals directly), whereas other stacks (such as that depicted in FIG. 2B) may be architected in a way that draws a clear distinction between the two (e.g. with planning in terms of trajectories, and with separate control optimizations to determine how best to execute a planned trajectory at the control signal level). Similarly, in some stacks, prediction and planning may be more tightly coupled. At the extreme, in so-called "end-to-end" driving, perception, prediction, planning and control may be essentially inseparable. Unless otherwise indicated, the perception, prediction planning and control terminology used herein does not imply any particular coupling or modularity of those aspects.

It will be appreciated that the term "stack" encompasses software, but can also encompass hardware. In simulation, software of the stack may be tested on a "generic" off-board computer system, before it is eventually uploaded to an on-board computer system of a physical vehicle. However, in "hardware-in-the-loop" testing, the testing may extend to underlying hardware of the vehicle itself. For example, the stack software may be run on the on-board computer system (or a replica thereof) that is coupled to the simulator for the purpose of testing. In this context, the stack under testing extends to the underlying computer hardware of the vehicle. As another example, certain functions of the stack 110 (e.g. perception functions) may be implemented in dedicated hardware. In a simulation context, hardware-in-the loop testing could involve feeding synthetic sensor data to dedicated hardware perception components.

Test Oracle

Figure 1B:
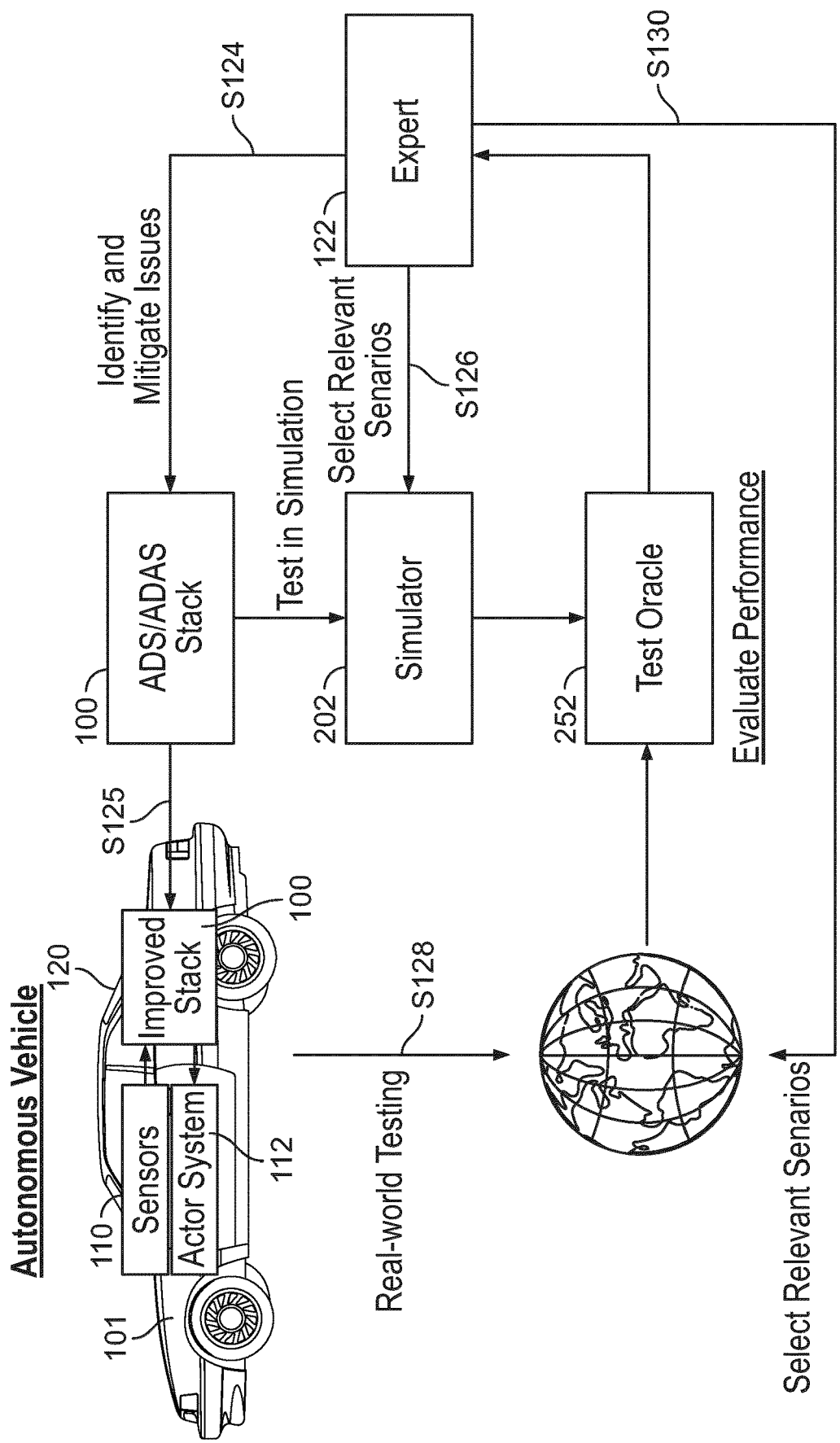
FIG. 1B shows a schematic overview of an autonomous vehicle testing paradigm.

FIG. 1B shows a highly schematic overview of a testing paradigm for autonomous vehicles. An ADS/ADAS stack 100, e.g. of the kind depicted in FIG. 1A, is subject to repeated testing and evaluation in simulation, by running multiple scenario instances in a simulator 202, and evaluating the performance of the stack 100 (and/or individual subs-stacks thereof) in a test oracle 252. The output of the test oracle 252 is informative to an expert 122 (team or individual), allowing them to identify issues in the stack 100 and modify the stack 100 to mitigate those issues (S124). The results also assist the expert 122 in selecting further scenarios for testing (S126), and the process continues, repeatedly modifying, testing and evaluating the performance of the stack 100 in simulation. The improved stack 100 is eventually incorporated (S125) in a real-world AV 101, equipped with a sensor system 110 and an actor system 112. The improved stack 100 typically includes program instructions (software) executed in one or more computer processors of an on-board computer system of the vehicle 101 (not shown). The software of the improved stack is uploaded to the AV 101 at step S125. Step 125 may also involve modifications to the underlying vehicle hardware. On board the AV 101, the improved stack 100 receives sensor data from the sensor system 110 and outputs control signals to the actor system 112. Real-world testing (S128) can be used in combination with simulation-based testing. For example, having reached an acceptable level of performance though the process of simulation testing and stack refinement, appropriate real-world scenarios may be selected (S130), and the performance of the AV 101 in those real scenarios may be captured and similarly evaluated in the test oracle 252.

Scenarios can be obtained for the purpose of simulation in various ways, including manual encoding. The system is also capable of extracting scenarios for the purpose of simulation from real-world runs, allowing real-world situations and variations thereof to be re-created in the simulator 202.

Figure 1C:
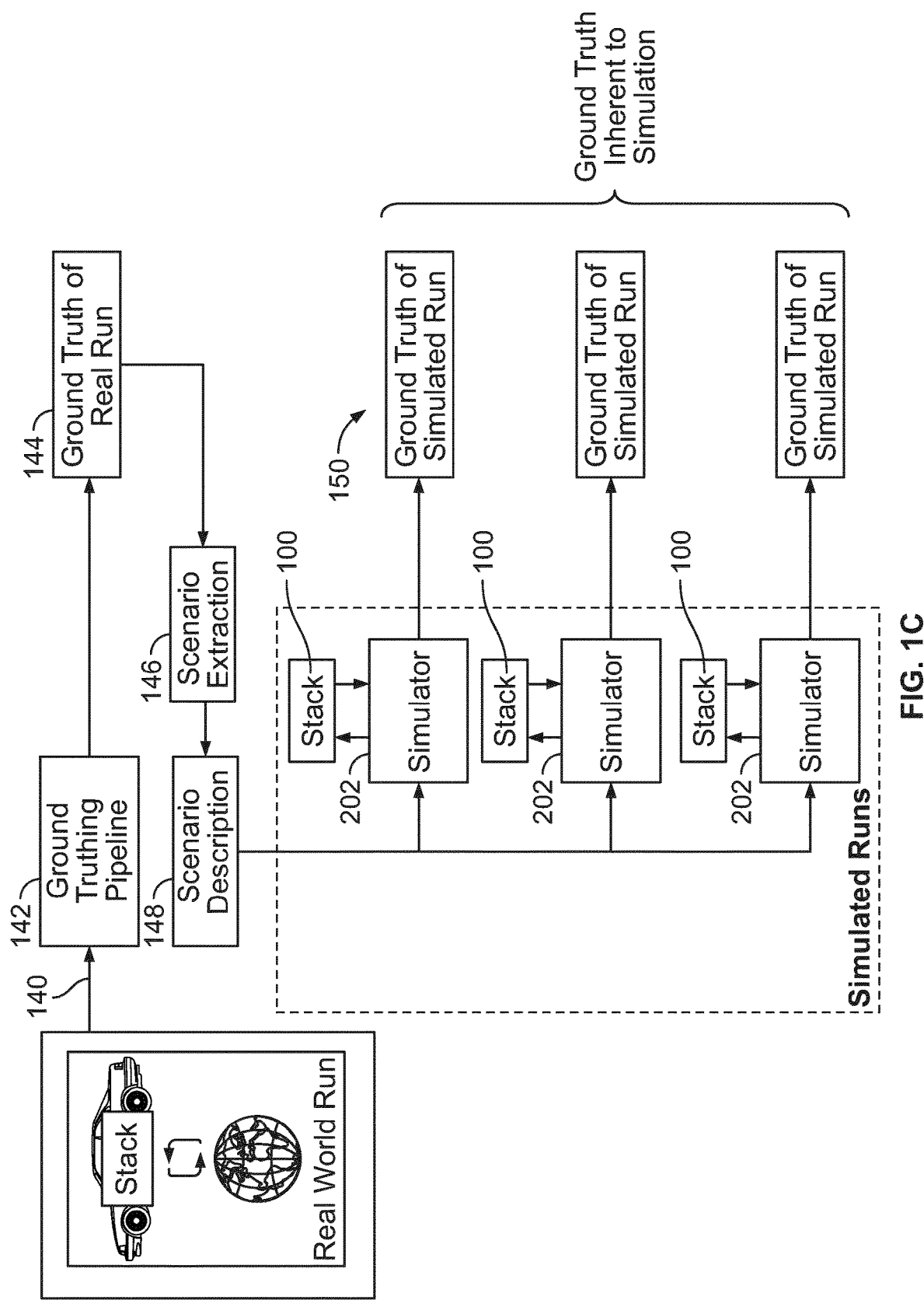
FIG. 1C shows a schematic block diagram of a scenario extraction pipeline.

FIG. 1C shows a highly schematic block diagram of a scenario extraction pipeline. Data 140 of a real-world run is passed to a 'ground-truthing' pipeline 142 for the purpose of generating scenario ground truth. The run data 140 could comprise, for example, sensor data and/or perception outputs captured/generated on board one or more vehicles (which could be autonomous, human-driven or a combination thereof), and/or data captured from other sources such external sensors (CCTV etc.). The run data is processed within the ground truthing pipeline 142, in order to generate appropriate ground truth 144 (trace(s) and contextual data) for the real-world run. As discussed, the ground-truthing process could be based on manual annotation of the 'raw' run data 142, or the process could be entirely automated (e.g. using offline perception method(s)), or a combination of manual and automated ground truthing could be used. For example, 3D bounding boxes may be placed around vehicles and/or other agents captured in the run data 140, in order to determine spatial and motion states of their traces. A scenario extraction component 146 receives the scenario ground truth 144, and processes the scenario ground truth 144 to extract a more abstracted scenario description 148 that can be used for the purpose of simulation. The scenario description 148 is consumed by the simulator 202, allowing multiple simulated runs to be performed. The simulated runs are variations of the original real-world run, with the degree of possible variation determined by the extent of abstraction. Ground truth 150 is provided for each simulated run.

The scenario extraction shown in FIG. 1C may also be used to extract real-world driving run data for testing and visualisation, i.e. the real ego states of a driving run may be extracted for visualisation of the real-world driving run in a perception visualisation user interface, as described later. Note that the term 'run data' is used herein to refer both to the 'raw' run data collected by the ego vehicle in a real-world driving run, such as sensor data, etc, and run data processed in testing and visualisation, which includes the 'ground truth' trace of the ego vehicle and contextual data. In the context of rule evaluation, run data also includes numerical scores measuring the performance of the ego vehicle against one or more run evaluation rules, which may include perception error rules or driving rules, as described in more detail below.

The test oracle 252 applies a rule-based model to evaluate the real or simulated behaviour of the autonomous vehicle stack (also referred to herein as the ego agent), as determined by the planner 106. However, the testing paradigm shown in FIG. 1B for the simulation context can also be implemented in the context of evaluating perception error, where a 'perception oracle' takes the place of the test oracle 252 and processes the scenarios in order to evaluate the perception errors against rules defined within a similar rules-based model described below for planning, referred to herein as a 'perception error framework'.

Perception errors are obtained by comparing the perception outputs generated by the perception component 102 with the scenario ground truth, which as described above is inherent to simulation, and which can be generated for real-world scenarios using a ground-truthing pipeline 142. Evaluation of perception errors within a perception error framework is described in further detail below. Perception error evaluation is also described in United Kingdom Patent Application Nos. 2108182.3, 2108958.6, 2108952.9 and 2111765.0, which are hereby incorporated by reference in their entirety.

Simulation Context

Further details of the testing pipeline and the test oracle 252 will now be described. The examples that follow focus on simulation-based testing. However, as noted, the test oracle 252 can equally be applied to evaluate stack performance on real scenarios, and the relevant description below applies equally to real scenarios. The following description refers to the stack 100 of FIG. 1A by way of example. However, as noted, the testing pipeline 200 is highly flexible and can be applied to any stack or sub-stack operating at any level of autonomy.

Figure 2A:
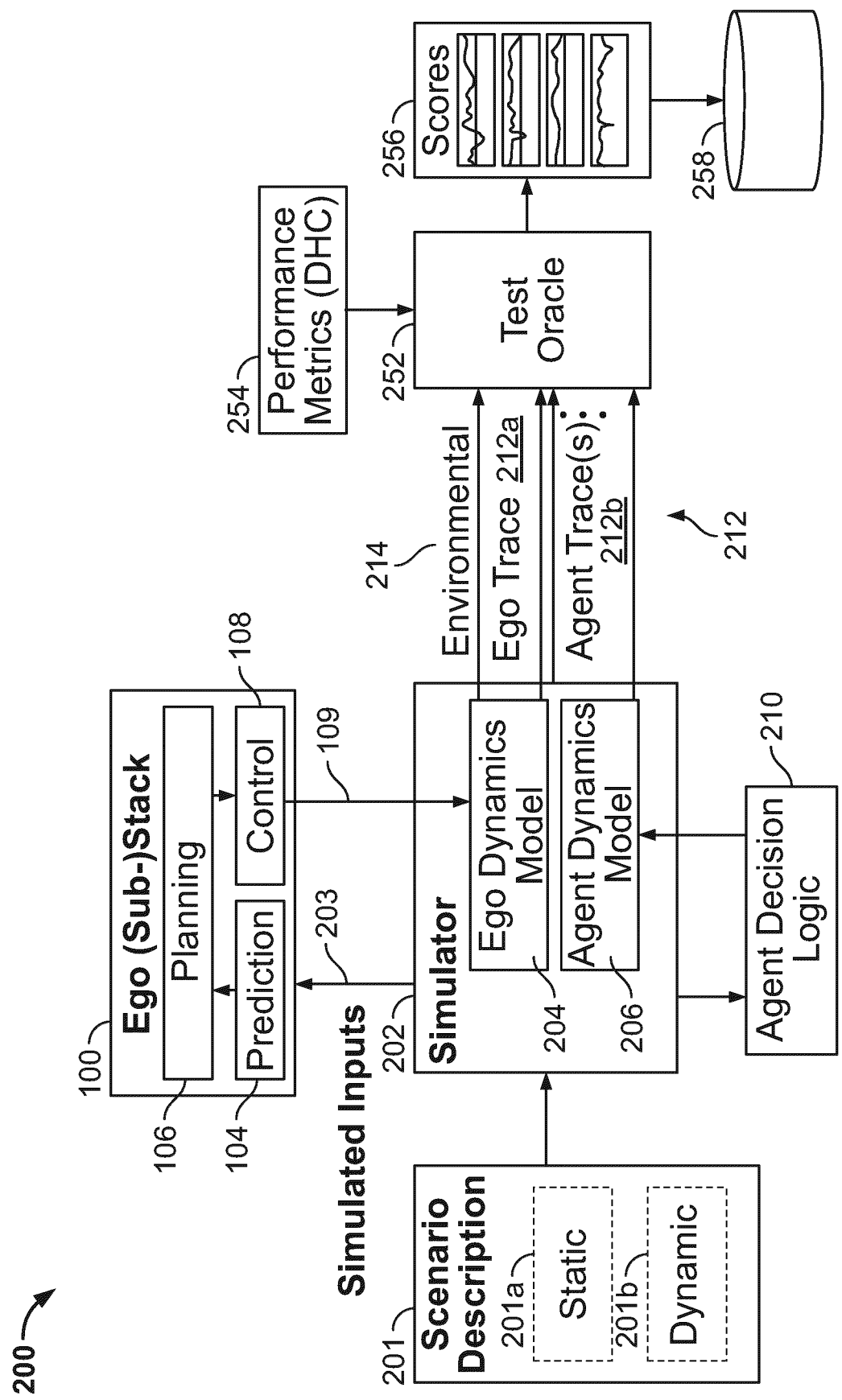
FIG. 2A shows a schematic block diagram of a testing pipeline.

FIG. 2A shows a schematic block diagram of a testing pipeline 200. The testing pipeline 200 is shown to comprise a simulator 202 and a test oracle 252. The simulator 202 runs simulated scenarios for the purpose of testing all or part of an AV run time stack, and the test oracle 253 evaluates the performance of the stack (or sub-stack) on the simulated scenarios. The following description refers to the stack of FIG. 1A by way of example. However, the testing pipeline 200 is highly flexible and can be applied to any stack or sub-stack operating at any level of autonomy.

The idea of simulation-based testing is to run a simulated driving scenario that an ego agent must navigate under the control of a stack (or sub-stack) being tested. Typically, the scenario includes a static drivable area (e.g. a particular static road layout) that the ego agent is required to navigate in the presence of one or more other dynamic agents (such as other vehicles, bicycles, pedestrians etc.). Simulated inputs feed into the stack under testing, where they are used to make decisions. The ego agent is, in turn, caused to carry out those decisions, thereby simulating the behaviour of an autonomous vehicle in those circumstances.

Simulated inputs 203 are provided to the stack under test. "Slicing" refers to the selection of a set or subset of stack components for testing. This, in turn, dictates the form of the simulated inputs 203.

By way of example, FIG. 2A shows the prediction, planning and control systems 104, 106 and 108 within the AV stack 100 being tested. To test the full AV stack of FIG. 1A, the perception system 104 could also be applied during testing. In this case, the simulated inputs 203 would comprise synthetic sensor data that is generated using appropriate sensor model(s) and processed within the perception system 102 in the same way as real sensor data. This requires the generation of sufficiently realistic synthetic sensor inputs (such as photorealistic image data and/or equally realistic simulated lidar/radar data etc.). The resulting outputs of the perception system 102 would, in turn, feed into the higher-level prediction and planning system 104, 106.

By contrast, so-called "planning-level" simulation would essentially bypass the perception system 102. The simulator 202 would instead provide simpler, higher-level inputs 203 directly to the prediction system 104. In some contexts, it may even be appropriate to bypass the prediction system 104 as well, in order to test the planner 106 on predictions obtained directly from the simulated scenario.

Between these extremes, there is scope for many different levels of input slicing, e.g. testing only a subset of the perception system, such as "later" perception components, i.e., components such as filters or fusion components which operate on the outputs from lower-level perception components (such as object detectors, bounding box detectors, motion detectors etc.).

By way of example only, the description of the testing pipeline 200 makes reference to the runtime stack 100 of FIG. 1A. As discussed, it may be that only a sub-stack of the run-time stack is tested, but for simplicity, the following description refers to the AV stack 100 throughout. In FIG. 2A, reference numeral 100 can therefore denote a full AV stack or only sub-stack depending on the context.

Whatever form they take, the simulated inputs 203 are used (directly or indirectly) as a basis for decision-making by the planner 108.

The controller 108, in turn, implements the planner's decisions by outputting control signals 109. In a real-world context, these control signals would drive the physical actor system 112 of AV.

In simulation, an ego vehicle dynamics model 204 is used to translate the resulting control signals 109 into realistic motion of the ego agent within the simulation, thereby simulating the physical response of an autonomous vehicle to the control signals 109.

To the extent that external agents exhibit autonomous behaviour/decision making within the simulator 202, some form of agent decision logic 210 is implemented to carry out those decisions and determine agent behaviour within the scenario. The agent decision logic 210 may be comparable in complexity to the ego stack 100 itself or it may have a more limited decision-making capability. The aim is to provide sufficiently realistic external agent behaviour within the simulator 202 to be able to usefully test the decision-making capabilities of the ego stack 100. In some contexts, this does not require any agent decision making logic 210 at all (open-loop simulation), and in other contexts useful testing can be provided using relatively limited agent logic 210 such as basic adaptive cruise control (ACC). One or more agent dynamics models 206 may be used to provide more realistic agent behaviour.

A simulation of a driving scenario is run in accordance with a scenario description 201, having both static and dynamic layers 201a, 201b.

The static layer 201a defines static elements of a scenario, which would typically include a static road layout.

The dynamic layer 201b defines dynamic information about external agents within the scenario, such as other vehicles, pedestrians, bicycles etc. The extent of the dynamic information provided can vary. For example, the dynamic layer 201b may comprise, for each external agent, a spatial path to be followed by the agent together with one or both of motion data and behaviour data associated with the path. In simple open-loop simulation, an external actor simply follows the spatial path and motion data defined in the dynamic layer that is non-reactive i.e. does not react to the ego agent within the simulation. Such open-loop simulation can be implemented without any agent decision logic 210. However, in closed-loop simulation, the dynamic layer 201b instead defines at least one behaviour to be followed along a static path (such as an ACC behaviour). In this case, the agent decision logic 210 implements that behaviour within the simulation in a reactive manner, i.e. reactive to the ego agent and/or other external agent(s). Motion data may still be associated with the static path but in this case is less prescriptive and may for example serve as a target along the path. For example, with an ACC behaviour, target speeds may be set along the path which the agent will seek to match, but the agent decision logic 110 might be permitted to reduce the speed of the external agent below the target at any point along the path in order to maintain a target headway from a forward vehicle.

The output of the simulator 202 for a given simulation includes an ego trace 212a of the ego agent and one or more agent traces 212b of the one or more external agents (traces 212).

A trace is a complete history of an agent's behaviour within a simulation having both spatial and motion components. For example, a trace may take the form of a spatial path having motion data associated with points along the path such as speed, acceleration, jerk (rate of change of acceleration), snap (rate of change of jerk) etc.

Additional information is also provided to supplement and provide context to the traces 212. Such additional information is referred to as "environmental" data 214 which can have both static components (such as road layout) and dynamic components (such as weather conditions to the extent they vary over the course of the simulation). To an extent, the environmental data 214 may be "passthrough" in that it is directly defined by the scenario description 201 and is unaffected by the outcome of the simulation. For example, the environmental data 214 may include a static road layout that comes from the scenario description 201 directly. However, typically the environmental data 214 would include at least some elements derived within the simulator 202. This could, for example, include simulated weather data, where the simulator 202 is free to change weather conditions as the simulation progresses. In that case, the weather data may be time-dependent, and that time dependency will be reflected in the environmental data 214.

The test oracle 252 receives the traces 212 and the environmental data 214, and scores those outputs in the manner described below. The scoring is time-based: for each performance metric, the test oracle 252 tracks how the value of that metric (the score) changes over time as the simulation progresses. The test oracle 252 provides an output 256 comprising a score-time plot for each performance metric, as described in further detail later. The scores are output to be stored in a database 258, where they can be accessed, for example to display the results in a user interface as described above. The metrics 254 are informative to an expert and the scores can be used to identify and mitigate performance issues within the tested stack 100.

Perception Error Models

Figure 2B:
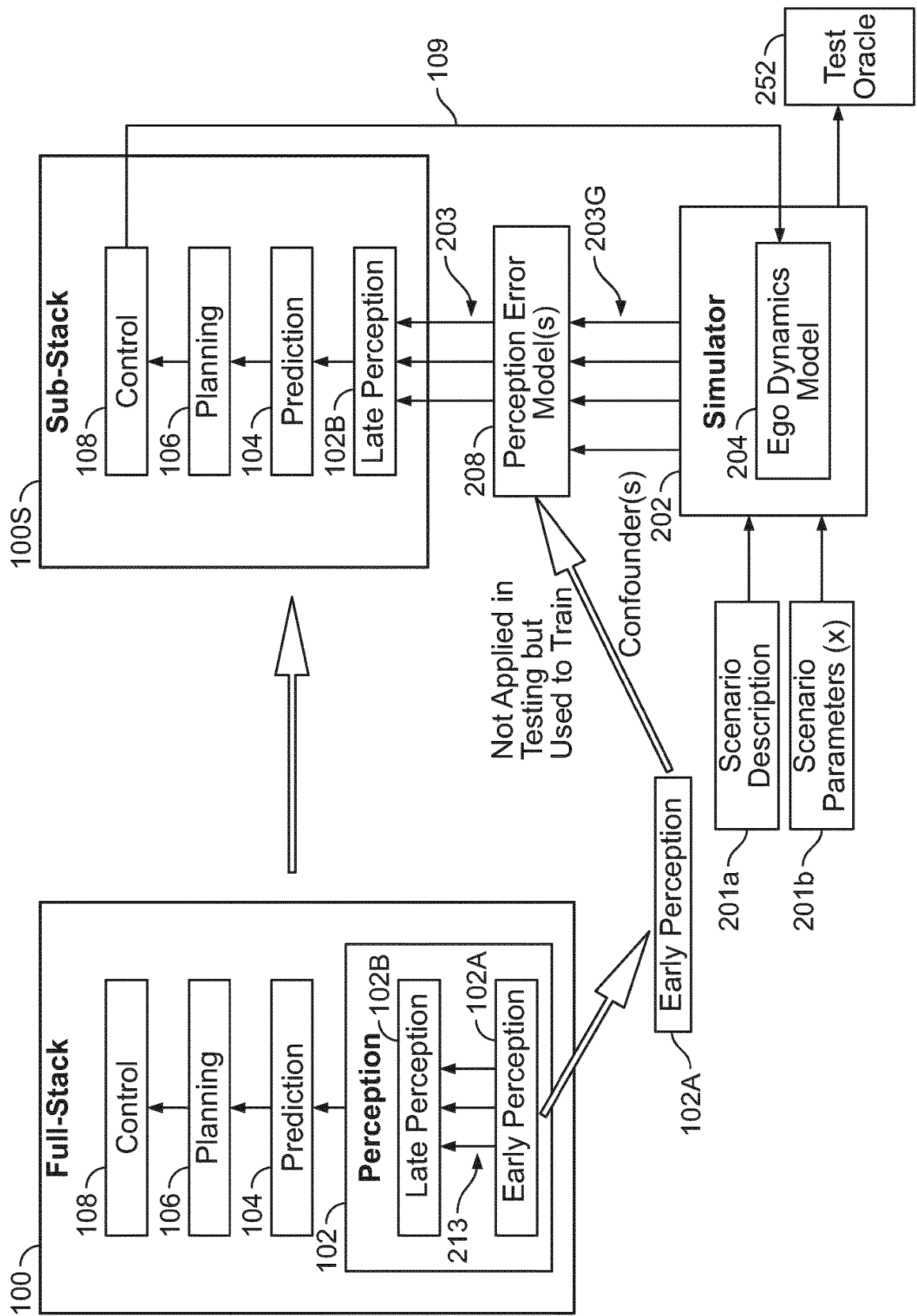
FIG. 2B shows further details of a possible implementation of the testing pipeline.

FIG. 2B illustrates a particular form of slicing and uses reference numerals 100 and 100S to denote a full stack and sub-stack respectively. It is the sub-stack 100S that would be subject to testing within the testing pipeline 200 of FIG. 2A.

A number of "later" perception components 102B form part of the sub-stack 100S to be tested and are applied, during testing, to simulated perception inputs 203. The later perception components 102B could, for example, include filtering or other fusion components that fuse perception inputs from multiple earlier perception components.

In the full stack 100, the later perception component 102B would receive actual perception inputs 213 from earlier perception components 102A. For example, the earlier perception components 102A might comprise one or more 2D or 3D bounding box detectors, in which case the simulated perception inputs provided to the late perception components could include simulated 2D or 3D bounding box detections, derived in the simulation via ray tracing. The earlier perception components 102A would generally include component(s) that operate directly on sensor data.

With this slicing, the simulated perception inputs 203 would correspond in form to the actual perception inputs 213 that would normally be provided by the earlier perception components 102A. However, the earlier perception components 102A are not applied as part of the testing, but are instead used to train one or more perception error models 208 that can be used to introduce realistic error, in a statistically rigorous manner, into the simulated perception inputs 203 that are fed to the later perception components 102B of the sub-stack 100 under testing.

Such perception error models may be referred to as Perception Statistical Performance Models (PSPMs) or, synonymously, "PRISMs". Further details of the principles of PSPMs, and suitable techniques for building and training them, may be bound in International Patent Application Nos. PCT/EP2020/073565, PCT/EP2020/073562, PCT/EP2020/073568, PCT/EP2020/073563, and PCT/EP2020/073569, incorporated herein by reference in its entirety. The idea behind PSPMs is to efficiently introduce realistic errors into the simulated perception inputs provided to the sub-stack 102B (i.e. that reflect the kind of errors that would be expected were the earlier perception components 102A to be applied in the real-world). In a simulation context, "perfect" ground truth perception inputs 203G are provided by the simulator, but these are used to derive more realistic perception inputs 203 with realistic error introduced by the perception error models(s) 208.

As described in the aforementioned reference, a PSPM can be dependent on one or more variables representing physical condition(s) ("confounders"), allowing different levels of error to be introduced that reflect different possible real-world conditions. Hence, the simulator 202 can simulate different physical conditions (e.g. different weather conditions) by simply changing the value of a weather confounder(s), which will, in turn, change how perception error is introduced.

The later perception components 102b within the sub-stack 100S process the simulated perception inputs 203 in exactly the same way as they would process the real-world perception inputs 213 within the full stack 100, and their outputs, in turn, drive prediction, planning and control. Alternatively, PSPMs can be used to model the entire perception system 102, including the late perception components 208.

One example rule considered herein for evaluation by a test oracle 252 is a "safe distance" rule that applies in a lane following context, and which is evaluated between an ego agent and another agent. The safe distance rule requires the ego agent to maintain a safe distance from the other threshold at all times. Lateral and longitudinal distance are both considered and, to pass the safe distance rule, it is sufficient for only one of those distances to satisfy some safety threshold (consider a lane driving scenario, with the ego agent and the other agent in adjacent lanes; when driving alongside each other, their longitudinal separation along the road may be zero or close to zero, which is safe provided a sufficient lateral separation between the agents is maintained; similarly, with the ego agent driving behind the other agent in the same lane, their latitudinal separation perpendicular to the direction of the road may be zero or close to zero assuming both agents are approximately following the midline of the lane, which is safe provided a sufficient longitudinal headway is maintained). A numerical score is computed for the safe distance rule at a given point in time based on whichever distance (latitudinal or longitudinal) is currently determinative of safety.

The safe distance rule is chosen to illustrate certain principles underpinning the described methodology because it is simple and intuitive. It will, however, be appreciated that the described techniques can be applied to any rule that is designed to quantify some aspect (or aspects) of driving performance, such as safety, comfort and/or progress towards some defined goal, by way of a numerical "robustness score". A time-varying robustness score over the duration of a scenario run is denoted s(t) and an overall robustness score for a run is denoted 1. For example, a robustness scoring framework may be constructed for driving rules that are based on signal-temporal logic.

In general, robustness scores such as the score described below with reference to FIGS. 3A and 3B, take quantities such as absolute or relative positions, velocities, or other quantities of agents' relative motion. The robustness score is typically defined based on a threshold to one or more of these quantities based on the given rule (for example, the threshold might define a minimum lateral distance to a nearest agent that is deemed acceptable in terms of safety). The robustness score is then defined by whether the given quantity is above or below that threshold, and the degree to which the quantity exceeds or falls below the threshold. The robustness score therefore provides a measure of whether the agent is performing how it should or how it is expected to perform relative to other agents and to its environment (including, e.g. any speed limits, etc. defined within the drivable area for the given scenario). It should be noted that numerical scores can be similarly defined for other aspects of run evaluation, including, for example, for evaluating perception errors.

Figure 3A:
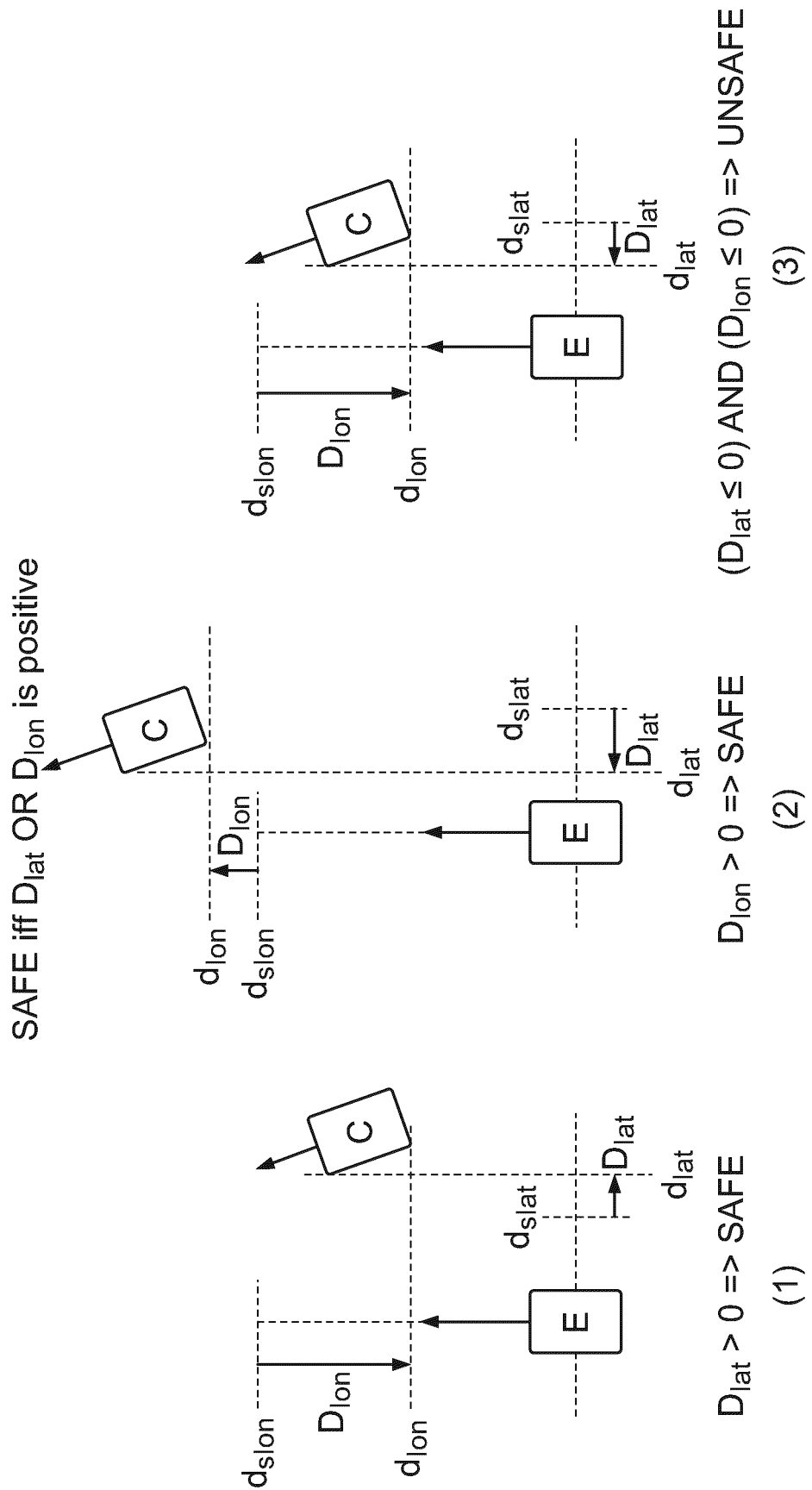
FIG. 3A shows an example of a rule graph evaluated within a test oracle.

FIG. 3A schematically illustrates the geometric principles of the safe distance rule, evaluated between an ego agent E and another agent C (the challenger).

Figure 3B:
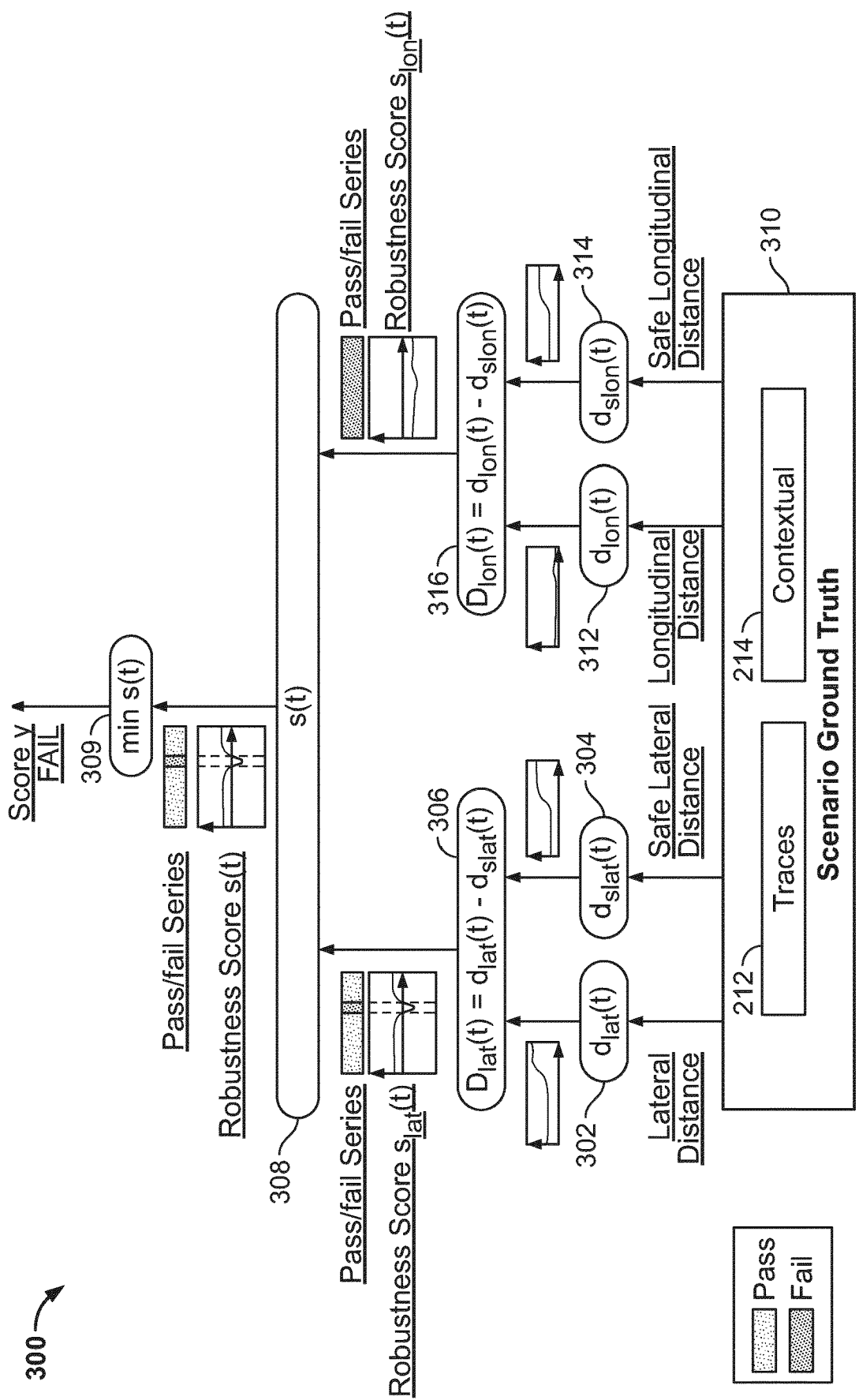
FIG. 3B shows an example output of a node of a rule graph.

FIGS. 3A and 3B are described in conjunction with each other.

Lateral distance is measured along a road reference line (which could be a straight line or a curve), and longitudinal separation is measured in the direction perpendicular to the road reference line. Lateral and longitudinal separation (distance between the ego agent E and the challenger C) are denoted by $d_{lat}$ and $d_{lon}$ respectively. Latitudinal and longitudinal distance thresholds (safety distances) are denoted by $d_{slat}$ and $d_{slong}$.

The safety distances $d_{slat}$, $d_{slon}$ are typically not fixed, but typically vary as functions of the agents' relative speed (and/or other factors, such as weather, road curvature, road surface, lighting etc.). Expressing the separations and safety distances as functions of time, t, latitudinal and longitudinal "headroom" distances are defined as:

$$D_{lat}(t) = d_{lat}(t) - d_{slat}(t)$$

$$D_{lon}(t) = d_{lon}(t) - d_{slon}(t).$$

FIG. 3A(1) shows an ego agent E at a safe distance from a challenger C, by virtue of the fact that the agents' lateral separation $d_{lat}$ is greater than the current lateral safety distance $d_{slat}$ for that pair of agents (positive $D_{lat}$).

FIG. 3A(2) shows an ego agent E at a safe distance from a challenger C, by virtue of the fact that the agents' longitudinal separation $d_{lon}$ is greater than the current longitudinal safety distance $d_{slon}$ for that pair of agents (negative $D_{lon}$).

FIG. 3A(3) shows an ego agent E at an unsafe distance from a challenger C. The safe distance rule is failed because both $D_{lat}$ and $D_{lon}$ are negative.

FIG. 3B shows the safe distance rule implemented as a computational graph applied to a set of scenario ground truth 310 (or other scenario data).

The latitudinal separation, latitudinal safety distance, longitudinal separation and longitudinal safety distance are extracted from the scenario ground truth 310 by, respectively, first, second, third and fourths extractor nodes 302, 304, 312, 314 of the computational graph 300 as time-varying signals. The latitudinal and longitudinal headroom distances are computed by first and second computational (assessor) nodes 306, 316, and converted to robustness scores as follows. The following examples consider normalized robustness scores over some fixed range, such as [−1,1], with 0 as the pass threshold.

The headroom distances quantify the extent to which the relevant safety distance is or is not breached: a positive latitudinal/longitudinal headroom distance implies that the latitudinal/longitudinal separation between the ego E and the challenger C is greater than the current latitudinal/longitudinal safety distance, and a negative headroom distance implies the opposite. Following the principles set out above, robustness scores for lateral and longitudinal distance may, for example, be defined as follows:

If $D_{lat}(t) > 0$ then $s_{lat}(t) = \min[1, D_{lat}(t)/A_{lat}]$

If $D_{lat}(t) \le 0$ the $s_{lat}(t) = \max[-1, D_{lat}(t)/B_{lat}]$

If $D_{lon}(t) > 0$ then $s_{lon}(t) = \min[1, D_{lon}(t)/A_{lon}]$

If $D_{lon}(t) \le 0$ then $s_{lon}(t) = \max[-1, D_{lon}(t)/B_{lon}]$

Here, A and B denote some predefined normalization distances (which may be the same or different for the lateral and longitudinal scores). For example, it can be seen that the longitudinal robustness score $s_{lon}(t)$ varies between 1 and −1 as $D_{lon}(t)$ varies between A, and $-B_{lon}$. For $D_{lon}(t) > A$, the longitudinal robustness score is fixed at 1, and for $s_{lon}(t) < B_{lon}$ the robustness score is fixed at −1. The longitudinal robustness score $s_{lon}(t)$ varies continuously over all possible values of longitudinal headroom. The same considerations apply to the lateral robustness score. As will be appreciated, this is merely one example, and a robustness score s(t) can be defined in various ways based on headroom distance.

Score normalization is convenient, because it makes the rules more interpretable, and facilitates comparison of the scores between different rules. However, it is not essential for scores to be normalized in this way. A score could be defined over any range with any failure threshold (not necessarily at zero).

The robustness score s(t) for the safe distance rule as a whole is computed by a third assessor node 308 as:

$$s(t) = \min[s_{lat}(t), s_{lon}(t)].$$

The rule is passed when s(t)>0 and failed when s(t)≤0. The rule is 'just' failed when s=0 (implying that one of the longitudinal and lateral separations is equal to its safety distance), representing the boundary between PASS and FAIL outcomes (performance categories).

Alternatively, s=0 could be defined at the point at which the ego E just passes; this is an immaterial design choice and, for that reason, the terms "pass threshold" and "failure threshold" are used interchangeably herein to refer to the subset of the parameter space where the robustness score y=0.

A pass/fail result (or, or more generally, a performance category) may be assigned to each time step of a scenario run based on the robustness score (t) at that time, which is useful to an expert interpreting the results.

In addition to assessing driving behaviour against driving rules, the rule framework described above may be used to evaluate other aspects of the autonomous vehicle stack that contribute to performance, for example by defining rules for perception error. Perception errors are determined based on a set of ground truth detections, which are inherent in simulation and which in real-world driving scenarios may be generated by manual annotation or by applying an offline perception pipeline, which utilises offline detection and refinement techniques that would not be available to an ego agent in real-time to produce high-quality perception outputs, which may be referred to herein as 'pseudo ground truth' perception outputs.

Figure 8:
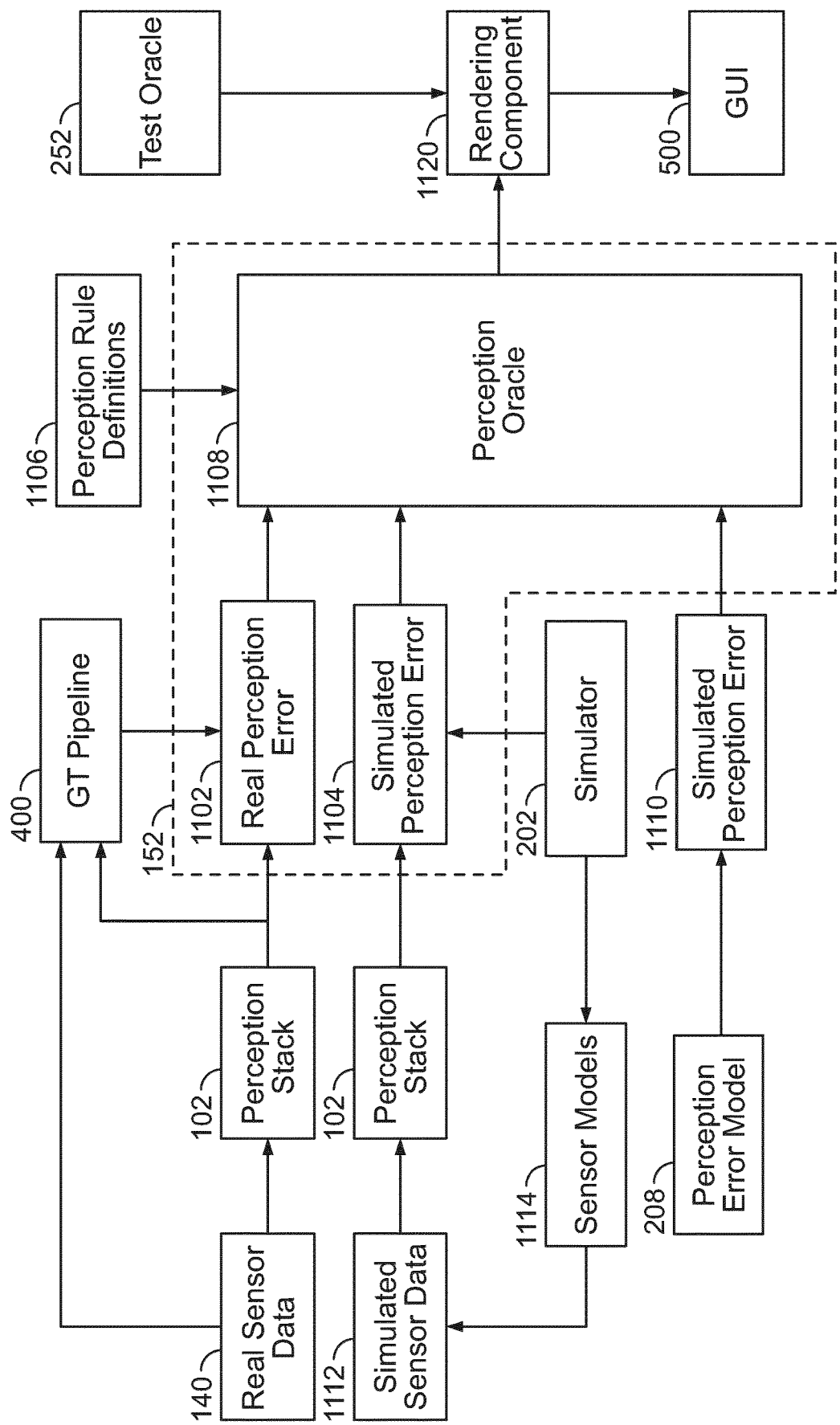
FIG. 8 shows an architecture for evaluating perception errors.

FIG. 8 shows an architecture for evaluating perception errors. A triage tool 152 comprising a perception oracle 1108 is used to extract and evaluate perception errors for both real and simulated driving scenarios, and outputs the results to be rendered in a GUI 500 alongside results from a test oracle 252. Note that while the triage tool 152 is referred to herein as a perception triage tool, it may be used more generally to extract and present driving data to a user, including perception data and driving performance data, that is useful for testing and improving an autonomous vehicle stack.

For real sensor data 140 from a driving run, the output of the online perception stack 102 is passed to the triage tool 152 to determine a numerical 'real-world' perception error 1102 based on the extracted ground truth 144 obtained by running both the real sensor data 140 and the online perception outputs through a ground truthing pipeline 400.

Similarly, for simulated driving runs, where the sensor data is simulated from scratch, and the perception stack is applied to the simulated sensor data, a simulated perception error 1104 is computed by the triage tool 152 based on a comparison of the detections from the perception stack with the simulation ground truth. However, in the case of simulation, the ground truth can be obtained directly from the simulator 202.

Where a simulator models perception error directly to simulate the output of the perception stack, the difference between the simulated detections and the simulation ground truth, i.e. the simulated perception error 1110 is known, and this is passed directly to the perception oracle 1108.

The perception oracle 1108 receives a set of perception rule definitions 1106 which may be defined via a user interface or written in a domain specific language, described in more detail later. The perception rule definitions 1106 may apply thresholds or rules defining perception errors and their limits. The perception oracle applies the defined rules to the real or simulated perception errors obtained for the driving scenario and determines where perception errors have broken the defined rules. These results are passed to a rendering component 1120 which renders visual indicators of the evaluated perception rules for display in a graphical user interface 500. Note that the inputs to the test oracle are not shown in FIG. 8 for reasons of clarity, but that the test oracle 252 also depends on the ground truth scenario obtained from either the ground truthing pipeline 400 or the simulator 202.

Further details of a framework for evaluating perception errors of a real world driving stack against an extracted ground truth will now be described. As noted above, both perception errors and driving rule analysis by the test oracle 252 can be incorporated into a real-world driving analysis tool, which is described in more detail below.

Not all errors have the same importance. For example, a translation error of 10 cm in an agent ten metres from the ego is much more important than the same translation error for an agent one hundred metres away. A straightforward solution to this issue would be to scale the error based on the distance from the ego vehicle. However, the relative importance of different perception errors, or the sensitivity of the ego's driving performance to different errors, depends on the use case of the given stack. For instance, if designing a cruise control system to drive on straight roads, this should be sensitive to translation error but does not need to be particularly sensitive to orientation error. However, an AV handling roundabout entry should be highly sensitive to orientation errors as it uses a detected agent's orientation as an indicator for whether an agent is leaving the roundabout or not, and therefore whether it is safe to enter the roundabout. Therefore it is desirable to enable the sensitivity of the system to different perception errors to be configurable to each use case.

A domain specific language is used to define perception errors. This can be used to create a perception rule, for example by defining allowable limits for translation error. This rule implements a configurable set of safe levels of error for different distances from the ego. For example, when the vehicle is less than ten meters away, the error in its position (i.e. the distance between the car's detection and the refined pseudo ground truth detection) can be defined to be no more than 10 cm. If the agent is one hundred meters away, the acceptable error may be defined to be up to 50 cm. Using lookup tables, rules can be defined to suit any given use case. More complex rules can be built based on these principles. For example, rules may be defined such that errors of other agents are completely ignored based on their position relative to the ego vehicle, such as agents in an oncoming lane in cases where the ego carriageway is separated from the oncoming traffic by a divider. Traffic behind the ego, beyond a defined cut-off distance, may also be ignored based on a rule definition.

A set of rules can then be applied together to a given driving scenario by defining a perception error specification which includes all the rules to be applied. Typical perception rules that may be included in a specification define thresholds on longitudinal and lateral translation errors (measuring mean error of the detection with respect to ground truth in the longitudinal and lateral directions, respectively), orientation error (defining a minimum angle that one needs to rotate the detection to line it up with the corresponding ground truth), size error (error on each dimension of the detected bounding box, or an intersection over union on the aligned ground truth and detected boxes to get a volume delta). Further rules may be based on vehicle dynamics, including errors in the velocity and acceleration of the agents, and errors in classifications, for example defining penalty values for misclassifying a car as a pedestrian or lorry. Rules may also include false positives or missed detections, as well as detection latency.

Based on the defined perception rules, it is possible to build a robustness score. Effectively, this can be used to say that if the detections are within the specified thresholds of the rules then the system should be able to drive safely, if they are not (e.g. they're too noisy) then something bad may happen that the ego vehicle may not be able to deal with, and this should be captured formally. Complex rule combinations can be included, for example to evaluate detections over time, and to incorporate complex weather dependencies.

The perception error framework is described in further detail in United Kingdom Patent Application Nos. 2108182.3, 2108958.6, 2108952.9 and 2111765.0, which are hereby incorporated by reference in their entirety.

User Interface

The testing frameworks described above, i.e. the test oracle 252 and perception triage tool 152, may be combined in a real-world driving analysis tool in which both perception and driving evaluation are applied to a perception ground truth extracted from a ground truth pipeline 400, as shown in FIG. 1C.

The results of the rule-based analysis described above for planning and perception of an AV stack provide numerical scores providing an indicator of the performance of the ego vehicle for each scenario. This numerical data can be interpreted directly by an expert as mentioned above to identify issues with the stack in order to improve the stack.

A user interface will now be described that provides a visualisation of the scenario being tested as well as the results of rule evaluation in order to present the user with the context of the scenario when identifying issues with the stack based on test results. The graphical user interface, described in more detail below, provides plots of numerical scores based on applying defined rules to signals extracted from the scenario, and also provides a visualisation of the scenario data such that any changes to the signals on which the numerical scores are based are also visual to a user in the scenario visualisation. This is useful in multiple applications.

In one example application, the user interface may be used to visualise real-world scenarios, and the visualisation may include a representation of the scenario with annotations of the perception outputs (e.g. bounding boxes) generated by the perception component 102 along with the pseudo ground truth perception outputs generated for example by a ground truthing pipeline or by manual annotation. This allows an expert user to easily identify where the ego vehicle's perception diverges significantly from the 'ground truth' perception outputs, for example if the user notices that the orientation of bounding boxes representing an agent in front of the ego vehicle differs significantly, this represents an orientation error. This can be used to visualise errors in which the ego stack's perception component 102 has made perception errors, and therefore to improve the perception stack. Another possible application is to identify where the ground truth perception annotations are incorrect, where this information can be used to improve the ground truthing method (whether manual or using an automatic ground truthing pipeline). The visualisation may additionally display raw sensor data alongside the perception outputs, which may help an expert user to identify whether the source of the error is a failure in the ego's perception stack or a failure in the ground truth perception. For example, where an orientation error exists between a bounding box output by the perception stack 102 and a ground truth bounding box, and a set of camera images or lidar measurements are overlaid on the visual representation of the scenario, an expert user can easily identify the correct orientation of an agent in the scenario, and therefore identify which perception output is the cause of the error. However, a user could not easily identify the source of the perception error based only on the numerical difference between the orientation of the two bounding boxes.

Figure 9A:
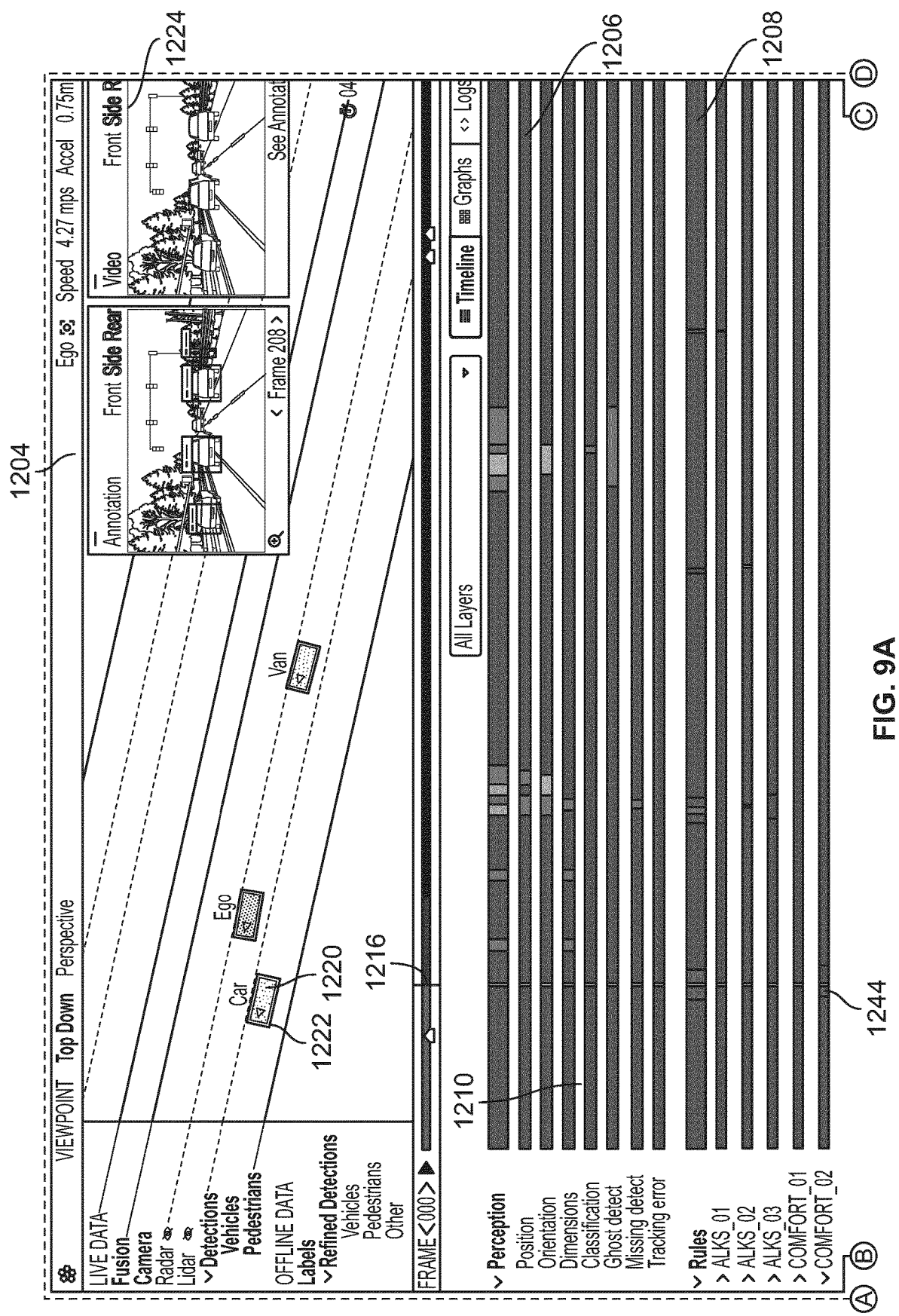
FIG. 9A shows an example graphical user interface for a triage tool.
Figure 9A:
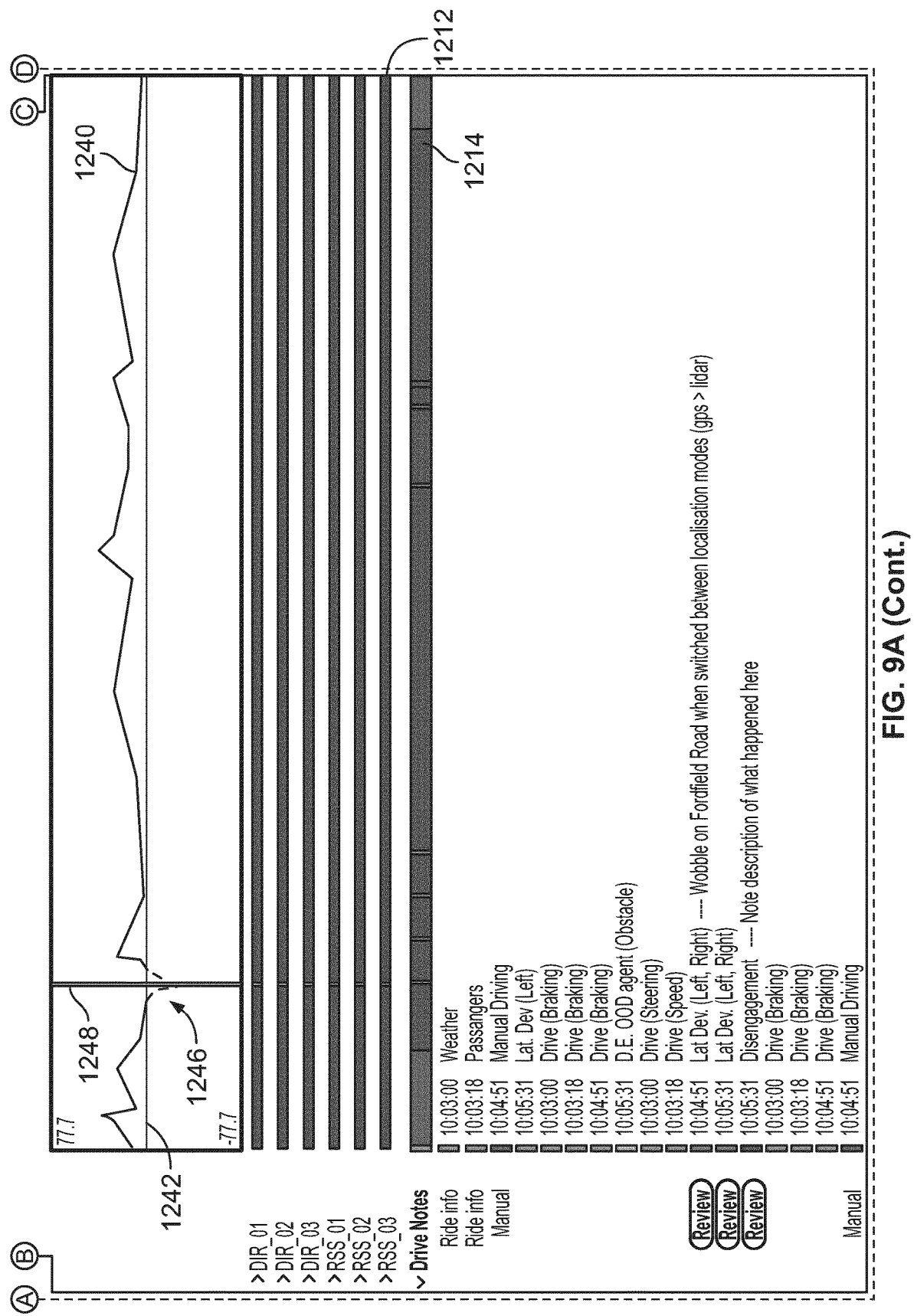
Figure 9B:
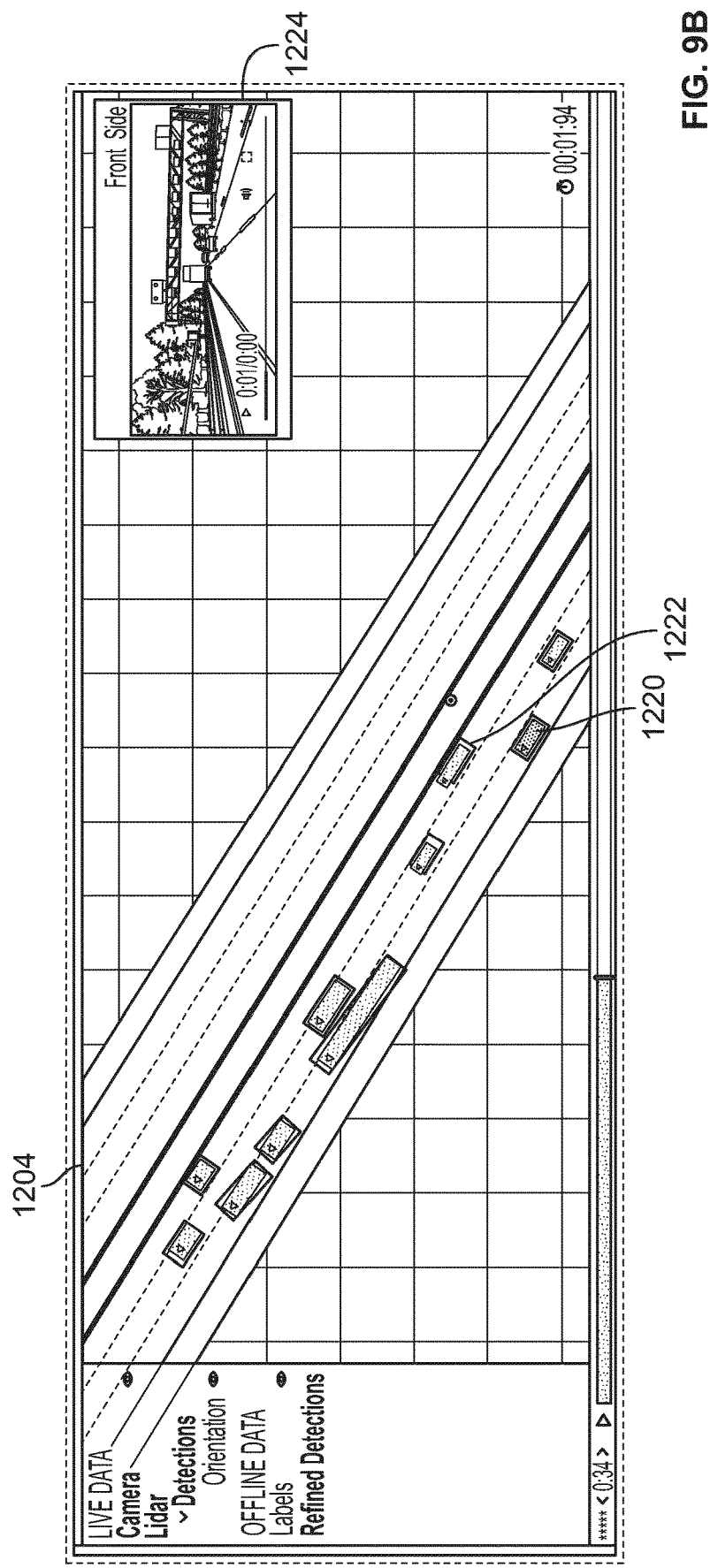
FIG. 9B shows a schematic representation of a driving scenario including sensor data displayed in a graphical user interface.

FIG. 9A shows an example user interface for analysing a driving scenario extracted from real-world data. In the example of FIG. 9A, an overhead schematic representation 1204 of the scene is shown based on point cloud data (e.g. lidar, radar, or derived from stereo or mono depth imaging) with the corresponding camera frames 1224 shown in an inset. Road layout information may be obtained from high-definition map data. Camera frames 1224 may also be annotated with detections. The UI may also show sensor data collected during driving, such as lidar, radar or camera data. This is shown in FIG. 9B. The scene visualisation 1204 is also overlaid with annotations based on the derived pseudo ground truth as well as the detections from the on-board perception components.

In the example shown there are three vehicles, each annotated by a box. The solid boxes 1220 show the pseudo ground truth for the agents of the scene, while the outlines 1222 show the unrefined detections from the ego's perception stack 102. A visualisation menu 1218 is shown in which a user can select which sensor data, online and offline detections to display. These may be toggled on and off as needed. The raw sensor data can be shown alongside both the vehicle's detections and the ground truth detections to allow a user to identify or confirm certain errors in the vehicle's detection. The UI 500 allows playback of the selected footage and a timeline view is shown where a user can select any point 1216 in the footage to show a snapshot of the bird's eye view and camera frames corresponding to the selected point in time.

As described above, the perception stack 102 can be assessed by comparing the detections with the refined pseudo ground truth 144. The perception is assessed against defined perception rules 1106, which can depend on the use case of the particular AV stack. These rules specify different ranges of values for discrepancies between the location, orientation, or scale of the car's detections and those of the pseudo ground truth detections. The rules can be defined in a domain specific language, as described above. As shown in FIG. 9A, different perception rule outcomes are shown along a 'top-level' perception timeline 1206 of the driving scenario, which aggregates the results of perception rules, with periods on the timeline flagged when any perception rules are broken. This can be expanded to show a set of individual perception rule timelines 1210 for each defined rule.

The perception error timelines may be 'zoomed out' to show a longer period of the driving run. In a zoomed-out view, it may not be possible to display perception errors at the same granularity as when zoomed in. In this case the timelines may display an aggregation of perception errors over time windows to provide a summarised set of perception errors for the zoomed-out view.

A second driving assessment timeline 1208 shows how the pseudo ground truth data is assessed against driving rules. The aggregated driving rules are displayed in a top-level timeline 1208, which can be expanded out to a set of individual timelines 1212 displaying the performance against each defined driving rule. Each rule timeline can be further expanded as shown to display a graph of numerical performance scores over time for the given rule. In this case, the pseudo ground truth detections 144 are taken as the actual driving behaviour of the agents in the scene. The ego behaviour can be evaluated against defined driving rules, for example based on the Digital Highway Code, to see if the car behaved safely for the given scenario.

In FIG. 9A, each driving rule timeline is expandable to show a plot of the associated robustness score. The timeline for a "COMFORT_02" driving rule is shown in an expanded state, such that an xy-style plot of the robustness score 1240 is visible. A pass/fail threshold 1242 is shown, with a fail region 1244 on the timeline corresponding to a region 1246 of the plot in which the score is below the threshold 1242. The user can 'scrub' along the plot (for example, around the pass/fail boundaries) to visually map the time-varying plot 1240 to corresponding changes in a visualization 1204 of the run. A marker (scrubber bar) 1248 is shown extending vertically though all of the rule timelines to indicate a current time step of the visualization 1204. The use scrub through the scenario (to see the scenario visualized at different time steps) by moving the marker 1248 horizontally along the rule timelines. Colour coding may be applied to the xy-plot, to show regions above the pass/fail threshold in a different colour than those below it. Further details of the scrubbing mechanism are described below, with reference to FIGS. 9C and 9D.

In summary, both the perception rule evaluation and driving assessment are based on using the offline perception methods described above to refine the detections from real-world driving. For driving assessment, the refined pseudo ground truth 144 is used to assess ego behaviour against the driving rules. As shown in FIG. 1C, this can also be used to generate simulated scenarios for testing. For perception rule evaluation, the perception triage tool 152 compares the recorded vehicle detections vs. the offline refined detections to quickly identify and triage likely perception failures.

Drive notes may also be displayed in a driver notes timeline view 1214, in which notable events flagged during the drive may be displayed. For example, the drive notes will include points at which the vehicle brakes or turns, or when a human driver disengages the AV stack.

Additional timelines may be displayed in which user-defined metrics are shown to help the user to debug and triage potential issues. User-defined metrics may be defined both to identify errors or stack deficiencies, as well as to triage errors when they occur. The user may define custom metrics depending on the goal for the given AV stack. Example user-defined metrics may flag when messages arrive out-of-order, when message latency of perception messages. This is useful for triage as it may be used to determine if a planning occurred due to a mistake of the planner or due to messages arriving late or out-of-order.

FIG. 9B shows an example of the UI visualisation 1204 in which sensor data is displayed, with a camera frame 1224 displayed in an inset view. Typically, sensor data is shown from a single snapshot in time. However, each frame may show sensor data aggregated over multiple time steps to get a static scene map in the case where high definition map data is not available. As shown on the left, there are a number of visualisation options 1218 to display or hide data such as camera, radar or lidar data collected during the real-life scenario, or the online detections from the ego vehicle's own perception. In this example, the online detections from the vehicle are shown as coloured boxes 1222 overlaid on top of the grey boxes 1220 representing the ground truth refined detections. An orientation error can be seen between the ground truth and the vehicle's detections.

The refinement process carried out by the ground truthing pipeline 400 is used to generate a pseudo ground truth 144 as a basis for multiple tools. The UI shown displays results from the perception triage tool 152, which allows assessing the driving ability of ADAS for single driving example using the test oracle 252, detecting defects, extracting a scenario to replicate the issue (see FIG. 1C) and sending the identified issues to a developer to improve the stack.

Figure 9C:
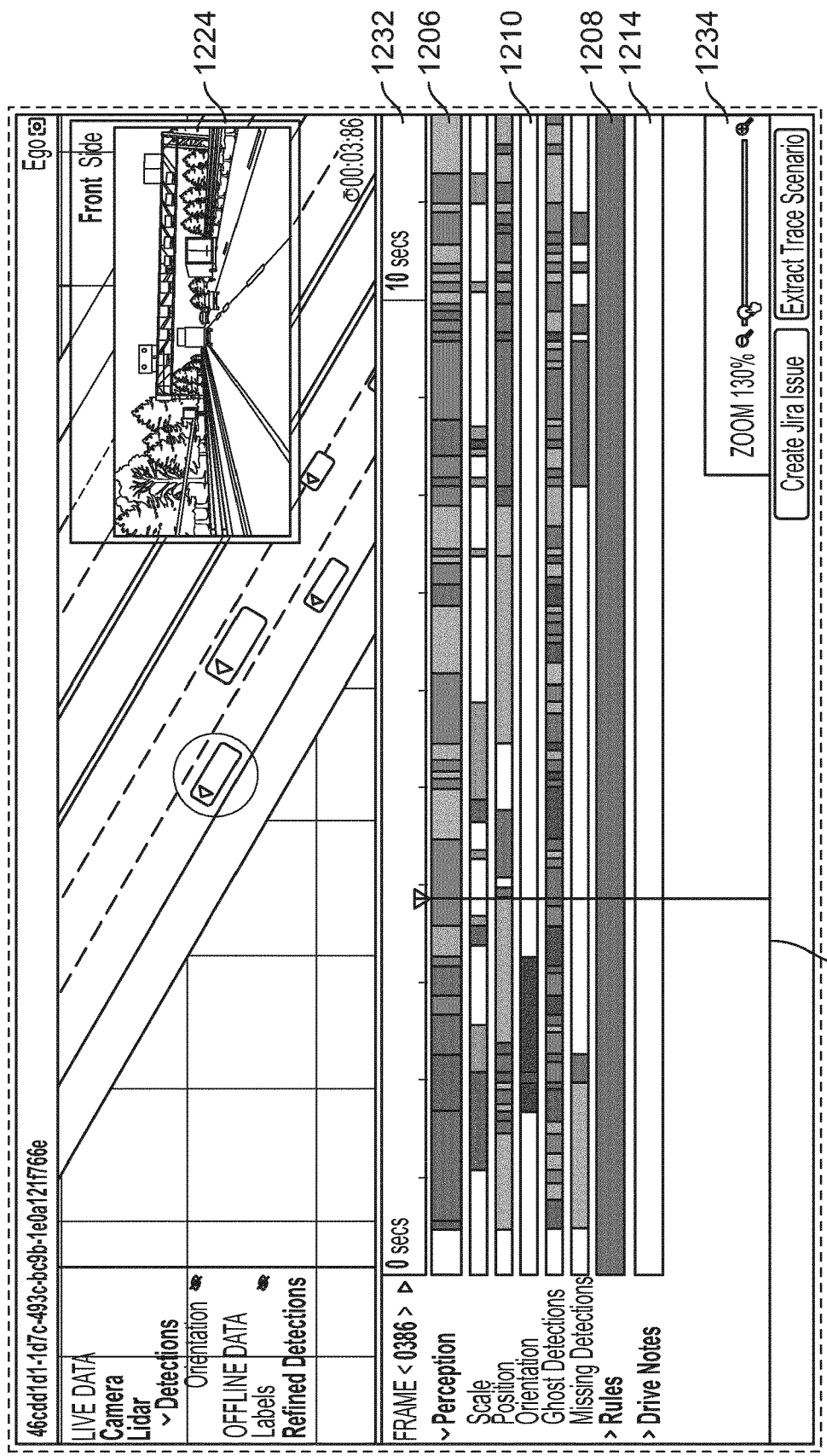
FIG. 9C shows an example user interface having zoom functionality and a timeline scrubber.

FIG. 9C shows an example user interface configured to enable the user to zoom in on a subsection of the scenario. FIG. 9C shows a snapshot of a scenario, with a schematic representation 1204 as well as camera frames 1224 shown in an inset view, as described above for FIG. 9A. A set of perception error timelines 1206, 1210 as well as an expandable driving assessment timeline 1208 and driver notes timeline 1214, as described above are also shown in FIG. 9C.

In the example shown in FIG. 9C, the current snapshot of the driving scenario is indicated by a scrubber bar 1230 which extends across all the timeline views simultaneously. This may be used instead of an indication 1216 of the current point in the scenario on a single playback bar. A user can click on the scrubber bar 1230 in order to select and move the bar to any point in time for the driving scenario. For example, a user may be interested in a particular error, such as a point within a section coloured red or otherwise indicated as a section containing an error on a position error timeline, wherein the indication is determined based on the positional error observed at that time between the 'ground truth' and the detections at the period of time corresponding to the indicated sector. The user can click on the scrubber bar and drag the bar to the point of interest within the position error timeline. Alternatively, the user can click on a point on any of the timelines across which the scrubber extends in order to place the scrubber at that point. This updates the schematic view 1204 and the inset view 1224 to show the respective top-down schematic view and camera frame corresponding to the selected point in time. The user can then inspect the schematic view and available camera data or other sensor data to see the positional error and identify possible reasons for the perception error.

A 'ruler' bar 1232 is shown above the perception timeline 1206 and below the schematic view. This contains a series of 'notches' indicating time intervals of the driving scenario. For example, where a time interval of ten seconds is displayed in the timeline view, notches indicating intervals of one second are shown. Some time points are also labelled with a numerical indicator e.g. '0 secs', '10 secs', etc.

A numerical score associated with a perception error rule may be continuous (e.g. floating point) or discrete (e.g. integer). A count of missed detections (as a function of time) is one example of an integer score. An extent of deviation from a perception ground truth (e.g. position or orientation offset of a detection from a corresponding ground truth) is an example of floating point score. Colour-coding may be used on the perception timeline to plot changes (or approximate changes) in the scores over time. For example, with an integer score, a different colour may be used for each integer value. A continuous score may be plotted using colour gradients, or 'quantized' into discrete buckets indicated using discrete colour coding. Alternatively or additionally, a perception error timeline may be 'expandable' in the same way as a driving rule (as in FIG. 9A), to view and xy-plot of the associated robustness score.

A zoom slider 1234 at the bottom of the user interface. The user can drag an indicator along the zoom slider to change the portion of the driving scenario which is shown on the timeline. Alternatively, the position of the indicator may be adjusted by clicking on the desired point on the slider bar to which the indicator should be moved. A percentage is shown to indicate the level of zoom currently selected. For example, if the full driving scenario is 1 minute long, the timelines 1206,1208,1214 show the respective perception errors, driving assessment and driver notes over the 1 minute of driving, and the zoom slider shows 100%, with the button being at the leftmost position. If the user slides the button until the zoom slider shows 200%, then the timelines will be adjusted to only show results corresponding to a thirty second snippet of the scenario.

The zoom may be configured to adjust the displayed portion of the timelines in dependence on the position of the scrubber bar. For example, where the zoom is set to 200% for a one minute scenario, the zoomed-in timelines will show a thirty second snippet in which the selected time point at which the scrubber is positioned is centred—i.e. fifteen seconds of the timeline is shown before and after the point indicated by the scrubber. Alternatively, the zoom may be applied relative to a reference point such as the start of the scenario. In this case, a zoomed-in snippet shown on the timelines after zooming always starts at the start of the scenario. The granularity of notches and numerical labels of the ruler bar 1232 may be adjusted depending on the degree to which the timelines are zoomed in or out. For example, where a scenario is zoomed in from 30 seconds to show a snippet of 3 seconds, numerical labels may be displayed before zooming at 10 second intervals with notches at one second intervals, and after zooming, the numerical labels may be displayed at one second intervals and notches displayed at 100 ms intervals. The visualisations of timesteps in timelines 1206,1208,1214 are 'stretched' to correspond to the zoomed-in snippet. A higher level of detail may be displayed on the timelines in a zoomed-in view as smaller snippets in time are representable by a larger area in the display of the timeline within the UI. Therefore, errors spanning a very short time within a longer scenario may only become visible in the timeline view once zoomed in.

Other zoom inputs may be used to adjust the timeline to display shorter or longer snippets of a scenario. For example, where the user interface is implemented on a touch screen device, the user may apply a zoom to the timelines by applying a pinch gesture. In another example, a user may scroll a scroll wheel of a mouse forwards or backwards to change the zoom level.

Where the timeline is zoomed in so as to only show a subset of the driving scenario, the timeline can be scrolled in time to shift the displayed portion in time, so that different parts of the scenario may be inspected by the user in the timeline view. The user can scroll by clicking and dragging a scroll bar (not shown) at the bottom of the timeline view, or for example using a touch pad on the relevant device on which the UI is running.

Figure 9D:
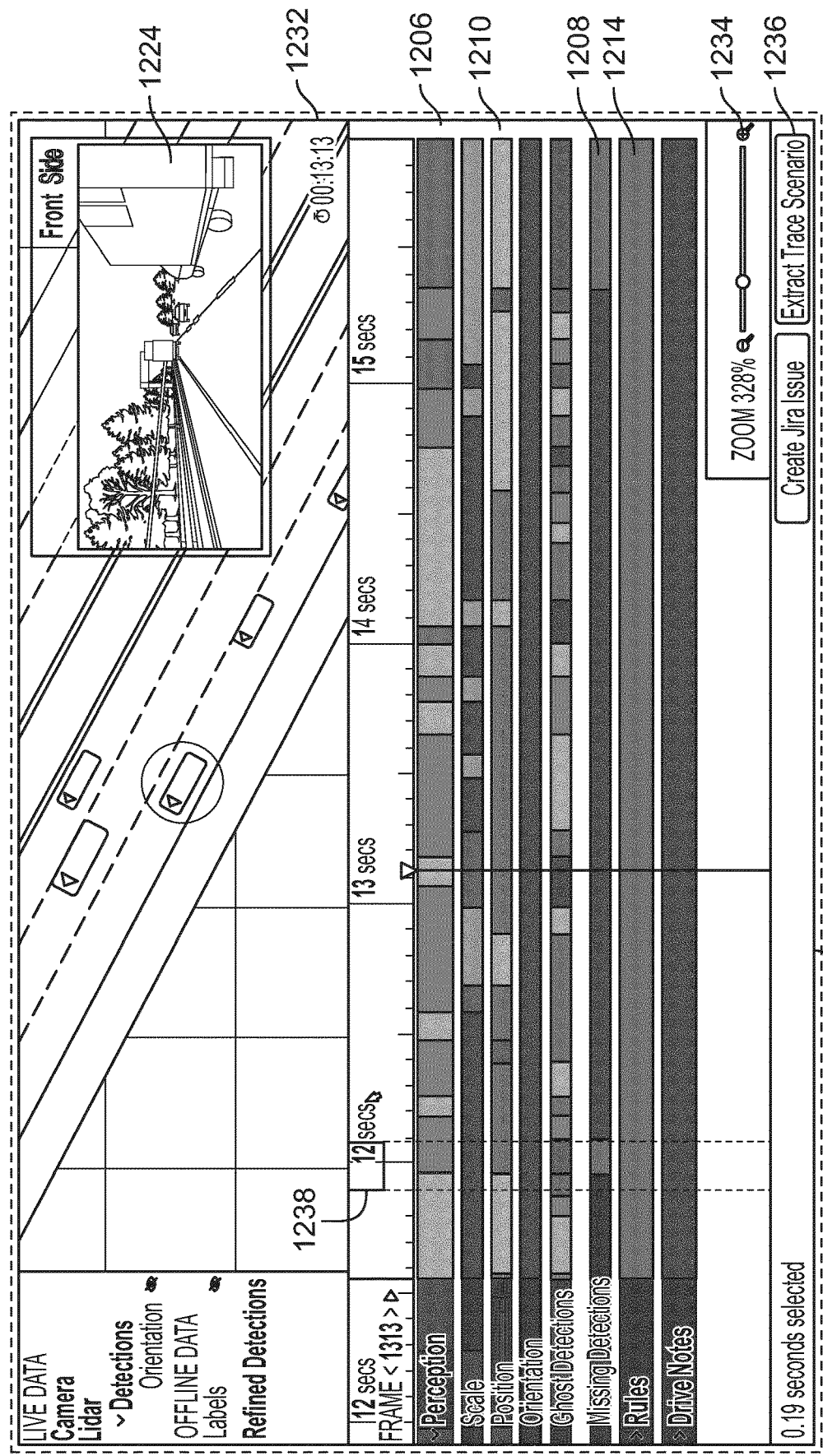
FIG. 9D shows the selection of a subsection of a scenario in the user interface.

A user can also select snippets of the scenario, for example to be exported for further analysis or as a basis for simulation. FIG. 9D shows how a section of a driving scenario can be selected by the user. The user can click with the cursor on a relevant point on the ruler bar 1232. This can be done at any level of zoom. This sets a first limit on a user selection. The user drags the cursor along the timeline in order to extend the selection to a chosen point in time. If zoomed in, by continuously dragging to the end of the displayed snippet of the scenario, this scrolls the timelines forward and allows the selection to be further extended. The user can stop dragging at any point, where the point at which the user stops is the end limit on the user selection. A bar 1230 at the bottom of the user interface displays the length in time of the selected snippet and this value is updated as the user drags the cursor to extend or reduce the selection. The selected snippet 1238 is shown a shaded section on the ruler bar. This section may be indicated by a section having a different colour to the rest of the ruler bar. A number of buttons 1236 are shown which provide user actions such as 'Extract Trace Scenario' to extract the data corresponding to the selection. This may be stored in a database of extracted scenarios. This may be used for further analysis or as a basis to simulate similar scenarios. After making a selection, the user can zoom in or out and the selection 1238 on the ruler bar 1232 also stretches or contracts along with the ruler and perception, driving assessment and drive note timelines.

Figure 10:
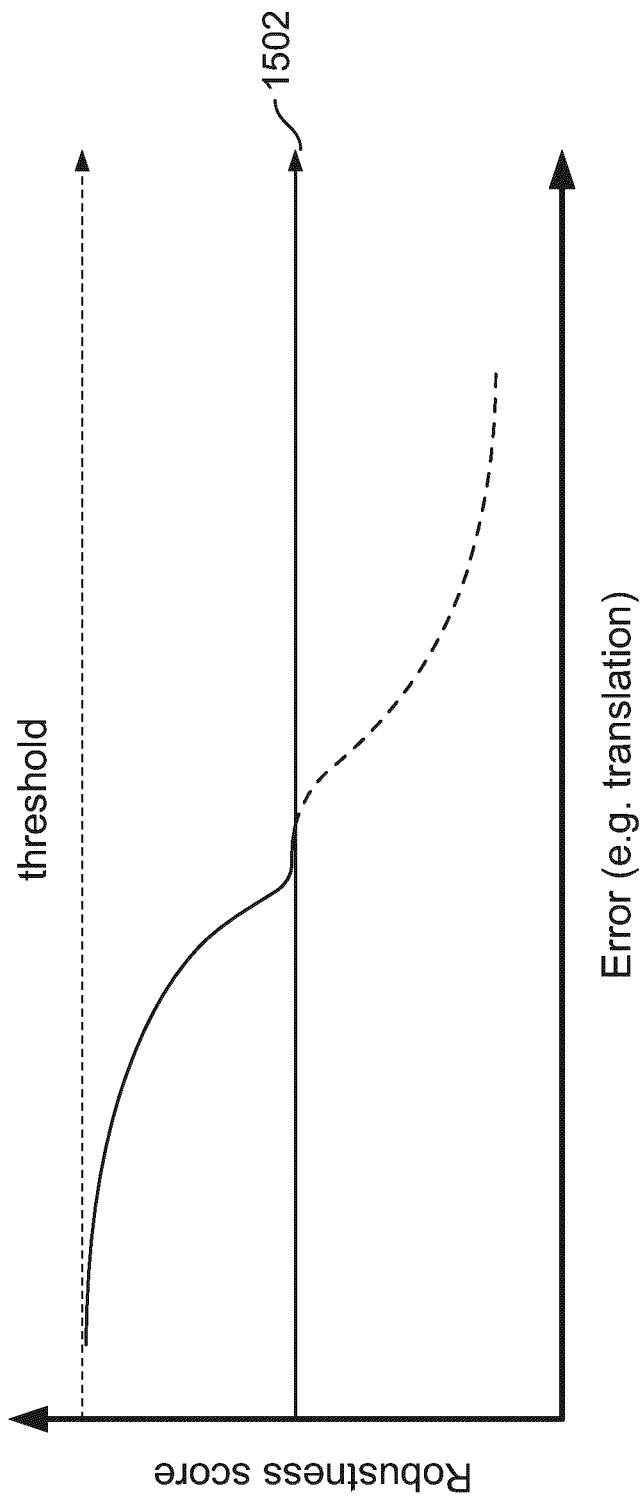
FIG. 10 shows an example graph of a numerical score for perception error with a defined error threshold.

The DSL can also be used to define a contract between the perception and planning stacks of the system based on a robustness score computed for the defined rules. FIG. 10 shows an example graph of a robustness score for a given error definition, for example a translation error. If the robustness score is above a defined threshold 1502, this indicates that the perception errors are within an expected performance, and the system as a whole should commit to drive safely. If the robustness score dips below the threshold 1502 as shown in FIG. 10, then the error is 'out-of-contract', as the planner 106 cannot be expected to drive safely for that level of perception error. This contract essentially becomes a requirement specification for the perception system. This can be used to assign blame to one of the perception subsystem 102 or planning subsystem 106. If an error is identified as in-contract when the car is misbehaving, then this points to issues with the planner rather than perception problems, and vice-versa for bad behaviour where perception is out-of-contract, the perception errors are responsible.

The contract information can be displayed in the UI 500, by annotating whether perception errors are deemed in-contract or out-of-contract. This uses a mechanism to take the contract spec from DSL and automatically flag out-of-contract errors in the front-end.

Further details of the example user interface described above for visualising perception errors and driving rules is described in United Kingdom Patent Application Nos. 2108182.3, 2108958.6, 2108952.9 and 2111765.0.

In another example application, as described in more detail herein, the visualisation may be used to allow an expert user to investigate errors in driving behaviours generated based on the output of the ego vehicle's planner 106. As described above, driving rules may be defined based on safety standards which specify safe distances between vehicles in various circumstances, such that breaking these rules indicates a possible safety risk. However, as described with respect to FIGS. 3A-3C, robustness scores for driving rules are not necessarily based on an easily interpreted, measurable quantity. In the example given above, the robustness scores for lateral and longitudinal distances are equal to a normalised difference between the actual distance and a threshold distance, or 1 if the normalised difference is above some predetermined difference. This numerical value is useful for easily determining the severity of the rule failure, but is not easy to interpret in terms of real world driving. By viewing these results within a visualisation of the scenario, in which the actual ego vehicle and other agents are shown driving along the road, the user can see the relative speeds of the vehicles, and the distance between them throughout the entire scenario. The expert user can navigate to the point in the scenario that corresponds, for example, to a point of failure based on the robustness score, and navigate back in the scenario to see what caused this rule failure, and possibly determine if it could be avoided in future by making adjustments to the AV planner 106.

Described above is a framework for evaluating an agent within a scenario according to a set of predefined rules and metrics for the behaviour and/or perception errors of the agent. As described above, an AV stack 100 may be assessed in simulation by evaluating the performance of the ego agent over the course of many simulated runs (or instances) for each of a set of abstract scenarios defined in a scenario description language and parameterised by a set of parameter values. A given instance of an AV stack is typically tested for a large number of scenarios having different parameters in a 'test suite'. A test suite is defined with a set of parameter ranges for the parameters of the scenarios to be run, and a set of rules (or 'ruleset') on which to evaluate the ego agent for that test suite. Once the test suite is run, a set of ego traces are generated, each comprising a time series of ego states over the course of the run, and a set of results are also output, comprising a pass/fail result of the ego agent for each rule of each scenario, as well as a time series of numerical scores (robustness scores) for the ego agent for each rule of each scenario, quantifying a degree of success or failure throughout the run. These results may be aggregated for the test suite to get an overall view of the performance of the ego vehicle over the set of scenario parameters being tested.

It may also be useful to compare two runs directly. In one example, a user testing an AV stack may wish to compare the ego vehicle's performance in two versions of the same abstract scenario in which a small number of the scenario parameters differ, in order to get a fine-grained view of how a given parameter value affects either the perception or the behaviour of the ego agent in that abstract scenario. In another example, the same scenario with the same parameter values may be run for two different versions of the ego agent's stack, for example where the planner is changed from one instance of the given test suite to the next. In this case, where the pass or failure of a given rule has differed between a previous stack version and a current stack version, and in particular in scenarios where the ego vehicle previously passed the rule but fails for an updated version (referred to herein as a regression), it is useful to view these runs in a common visualisation tool in order to determine at what point in the scenario the behaviour of the two versions of the ego agent diverged, and to allow the user to identify a cause of the regression.

Figure 4:
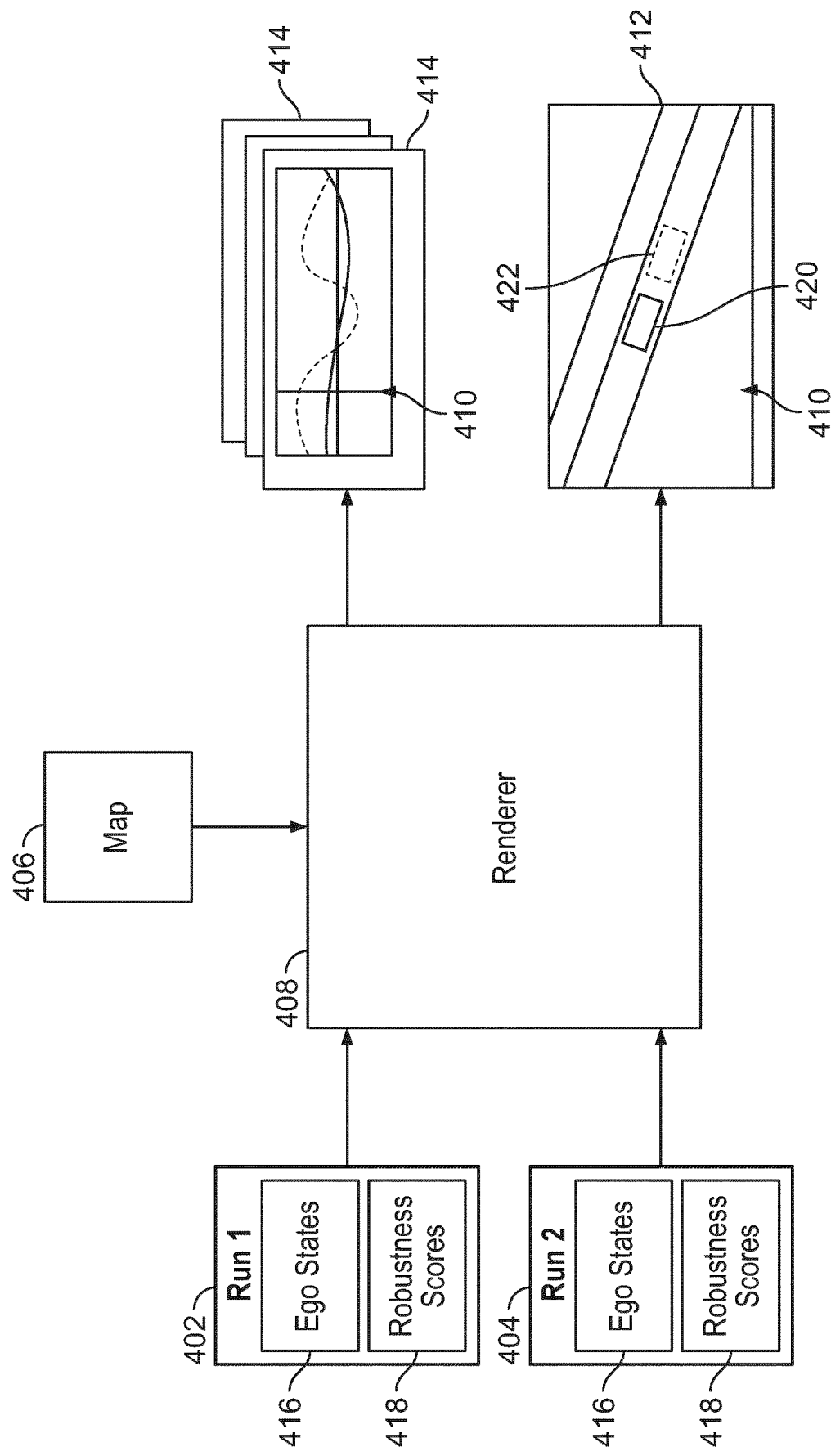
FIG. 4 shows a schematic block diagram of a computer system for rendering a run visualisation user interface.

FIG. 4 shows a schematic block diagram of a computer system for rendering a run visualisation interface in accordance with embodiments of the present disclosure. FIG. 4 shows data of a first run 402 and a second run 404 being provided as inputs to the renderer. However, the visualisation interface can also be implemented for displaying a single run. As mentioned above, the first and second runs may be scenario instances where one or more scenario parameters for the two runs take different values, or alternatively, where the two runs belong to tests of two respective versions of the ego stack, the scenario parameters may be the same. Each run comprises a time series 416 of ego states, where the ego state includes spatial and motion coordinates of the ego vehicle at each time step of the run, as well as a set of robustness scores 418 for the ego agent defined for each of a set of rules defined for the ego agent's perception and/or behaviour over the course of the run, as described above.

In addition to the run data, a map is provided to the renderer defining a static road layout of the scenario. This comprises a representation of road lanes and road features such as junctions and roundabouts. Each scenario instance has an associated map. The maps may be obtained from a map database.

A rendering component 408 receives the run data of both runs and the map data 406 and renders a common visualisation 412 showing a snapshot of both runs overlaid on the same map, as well as a plot 414 of the robustness score for each of the rules of the ruleset, with the robustness score for both runs plotted on a common set of axes. A control may be provided for a user to manually align both runs, such that the visualisation shows equivalent points of both runs to allow direct visual comparison. Both the map visualisation 412 and the robustness score plots 414 comprise a time axis with a time marker 410, which marks a common time instance within both runs. The time marker 410 for the robustness score plots may be implemented in the form of a scrubber bar 1230, as described above with reference to FIG. 9C, or as a dot or circle or other indicator along the individual timelines, as described below with reference to FIGS. 5 and 6.

A user control is provided to move the time marker of the map visualisation 412 to move the visualisation forward to update the visualisation to show the state of the ego agent for each run at the time instant to which the marker is moved along the time axis. This control can also be used to update the time marker 410 of the plots for each rule, to identify the robustness score of the ego agent for each run at the selected time instant, as shown by the line in the robustness plot. The robustness plots 414 are shown in FIG. 4 in an expanded view, with the numerical robustness score along the y-axis and time along the x-axis. An alternative view of the robustness plots provides a binary indicator based on a pass/fail scheme, where a timeline is shown with sections of the time in which the robustness score was above or below some threshold of pass/failure are identified, for example, by a colour scheme, where portions of the scenario run in which the ego agent was failing the given rule are shown on the timeline in red, while portions in which the rule was followed are shown as green. This is shown and described in further detail below with respect to FIGS. 5 and 6.

In the map visualisation 412, the ego agent may be represented in different colours for each run. Although not shown in FIG. 4, scenario runs typically include one or more external agents driving within the same road layout, and these are also represented in different colours in order to visually distinguish the agents of the scenario for each run. The map visualisation 412 and robustness plots are provided within a common user interface display, which is described in more detail with reference to FIGS. 5 and 6.

Figure 5:
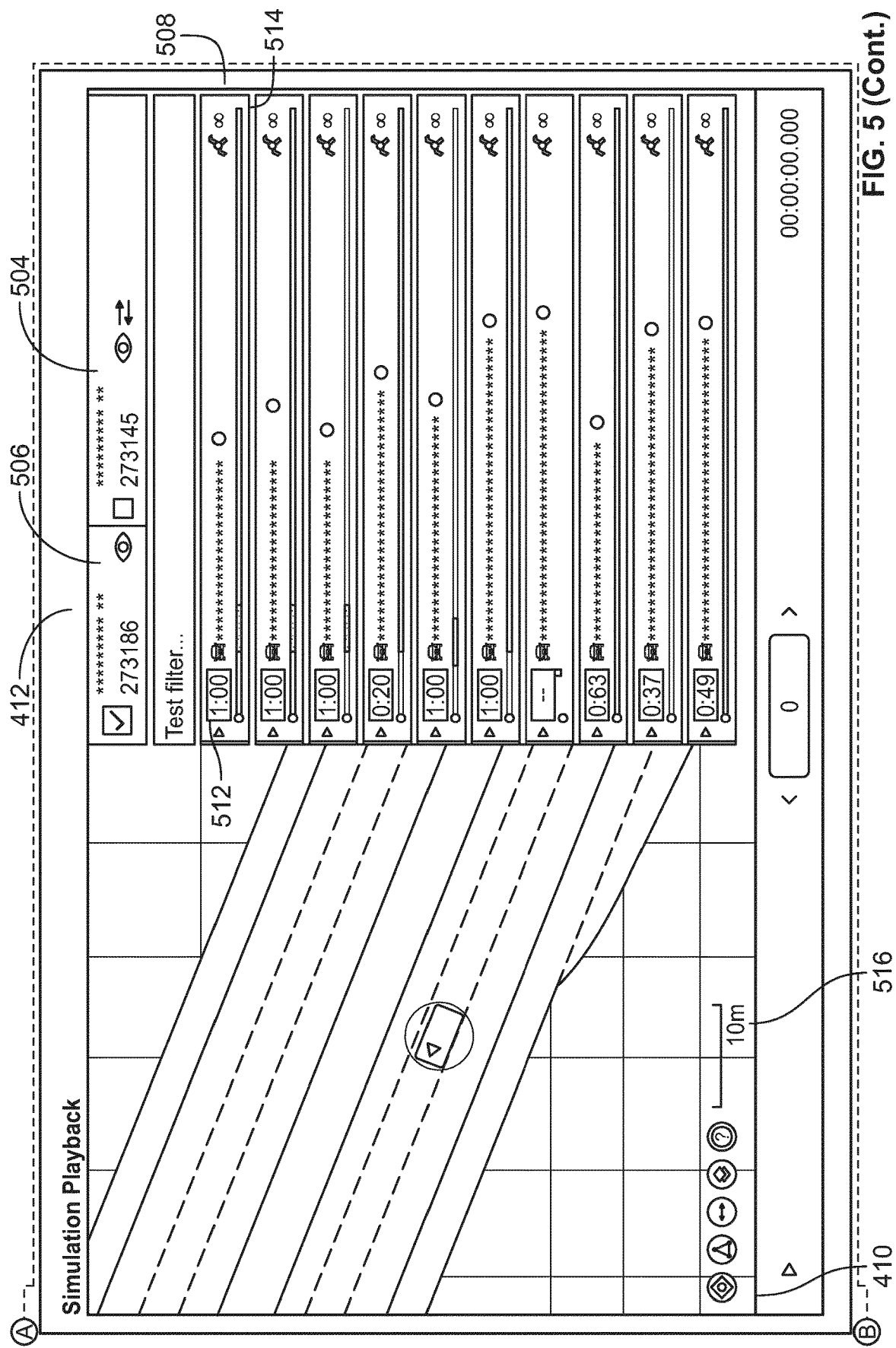
FIG. 5 shows a single-run view of an example run visualisation user interface.

FIG. 5 shows an example run visualisation user interface in a single-run view, where two runs are available for display, but only one run is selected in a selection pane shown with a first checkbox 506 for the first run, and a second checkbox 504 to select the second run for display. As shown in FIG. 5, the second checkbox is deselected, so only the first run is displayed in the visualisation 412, and rule evaluation timelines 508 are provided that only show the performance of the ego agent for the first run. In the present example, the rule evaluation timelines are displayed in an unexpanded view as described above, where a single time axis is shown as a line, where the failure of the ego agent against a given rule is shown as a red section on the timeline for that rule, and where the time that the ego agent did not fail the rule is shown in green. Each rule timeline 508 is identified by a name of the rule (for example DR_01) and a title of the rule, such as 'collisions'. A numerical indicator 512 is also shown that provides the numerical robustness score for a selected timestep. An expansion control 514 is provided, which can be clicked by the user to display an expanded view of the rule timeline which comprises the robustness plot for that rule, as will be described in further detail with reference to FIG. 6.

The timestep within the run is indicated by a time marker 410, which is shown as a small circle at the start of both the rule timeline 508 and on a timeline provided at the bottom of the display. The marker of the overall timeline may be adjusted by a user by clicking and dragging the indicator along the timeline to move the visualisation to the selected point within the run. The display time marker 410 for the set of rule timelines and the time marker of the overall timeline refer to the same underlying data, such that a user control to adjust the time marker for one timeline also adjusts the time marker for all the rule timelines 508. The robustness score for each rule is indexed by time, such that an update of the time marker for each rule causes the robustness score displayed in the numerical indicator 512 to be updated to reflect the selected point in time. A search bar is provided where a user can input text filters in order to display only rules relating to a given keyword. For example, a user could input 'collision' to return rule evaluation timelines for rules involving the word 'collision', either in the name of the rule or in the description.

In the example of FIG. 5, the set of robustness/rule evaluation plots/timelines 508 are displayed within the scenario visualisation 412, which comprises the map visualisation and the overall timeline. Within the map visualisation, the agent in the first run is shown driving along a lane of a highway. At the selected time instant (in this example the start time of the run) no other agents are within view.

A set of controls 516 are provided to adjust the display of the map. These could include, for example, a control to re-orient the map according to some predefined default directional layout (for example adjusting the map such that north corresponds to the upward direction in the visualisation). A 'track agent' control is shown on the left, which is clicked to enable tracking of the ego agent such that the ego agent's vehicle is always shown at the centre of the visualisation during playback of the scenario. A sensor control can be enabled to show a visualisation of the field of view of each of the sensors of the ego vehicle. A button with additional controls may be provided to display further options to a user, including, for example, a measurement tool, debug mode, and different camera position views. A scale indicator shows a reference distance for comparison with the distances in the driving scenario.

In addition to the visualisation 412, the user interface additionally includes a comparison table 502 showing the applicable rules of the scenario and an aggregated pass/fail result for the ego agent for each of the selected runs. As shown in FIG. 5, the comparison table 502 defines at the top the instances being compared, which are identified by respective indexes. Parameter values of the scenario for each instance are also displayed. In the present example, a γ-velocity is set at '1.6' for both runs. Other parameters could include weather conditions, lighting etc. A table of rules is shown in which each rule is displayed in a single row with a brief description of the function of that rule, and a fail or pass indicator is shown for that rule for each of the instances identified in the respective columns of the table. As described above, the pass and fail conditions for each rule are specified in the rule definition. For example, a rule specifying a minimum distance to another vehicle may be failed if the ego agent is less than this minimum distance from another agent for even a short period of time. Pass and fail results are shown in green and red to allow a user to quickly identify rules for which the two runs diverge. Where a given rule is failed for a first run and passed for another, this rule can be examined for the single-run view by selecting one of the runs and reviewing the rule evaluation timeline 508 corresponding to the given rule. The user may review each of the runs in turn in the single run view by selecting the checkbox corresponding to that run and ensuring the checkbox for the other run is deselected as shown for the checkboxes 504, 506 in FIG. 5.

Figure 6:
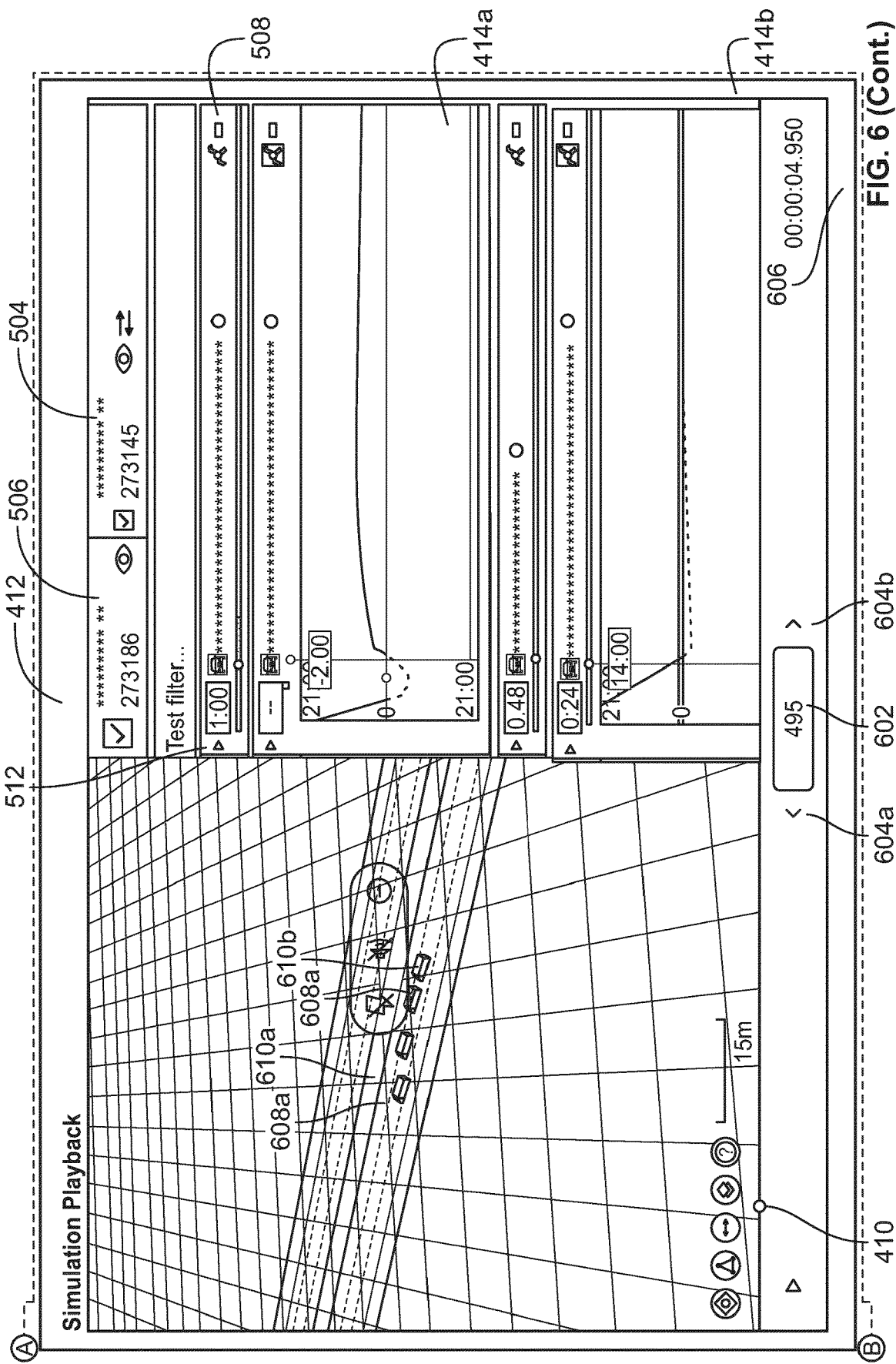
FIG. 6 shows a run-comparison view of an example run visualisation user interface.

FIG. 6 shows the user interface for a run comparison view in which two runs are compared in a common visualisation 412. In this example, both the first run check box 506 and the second run check box 504 are selected, such that both runs are displayed. Instead of selecting the checkbox, a user may alternatively hover over the eye icon corresponding to the first to show the visualisation for that run only. In the map view, the ego agent 610a and external agent 608a for the first run are shown, while the ego agent 610b and external agent 608b for the second run are shown at different respective positions on the same road layout. The ego agent and external agent may be indicated by different colours in the UI, for example the ego agent for a first run may be shown in blue, while the external agent is shown in grey. The agents for a second run may be indicated by a different colour, e.g. orange. The time marker 410 shows the progress of both runs along a common timeline. A frame number 602 is also shown, and controls 604a, 604b are provided that the user can select to click through frames of the run one by one either forwards or backwards in time, where each frame corresponds to one ego state of the time series of ego states received by the renderer. The time (from the start of the scenario) is also shown on the right of the timeline. In this example, frames correspond to regular intervals of 0.01 s, such that the current time of 4.950 s corresponds to frame 495.

In the run comparison view, the rule evaluation timeline is displayed for the first run as shown previously for the single run view. The time marker for each rule evaluation timeline is positioned at the same relative point along the timeline as the selected point on the main timeline for the overall visualisation 412. FIG. 6 shows an expanded view for the 'ALKS_03' rule, including a robustness plot 414a with both the robustness score for both the first and second runs plotted on the same axis. which checks the headway cut-in response.

When the user moves the time marker along the expanded timeline for a given rule, the time markers for all other rules as well as the timeline of the overall visualisation is updated to the corresponding timestep selected by the user.

Another rule 'ALKS_05—Stable lateral position' is shown in an expanded view with a robustness plot 414b. In this plot, the robustness score for both the first and second runs are plotted. The time marker has an associated line parallel to the y-axis at the selected time, that intersects with the plots for each of the runs. A label shows the value of the robustness score for each of the runs at the selected time. In this example, the first run has a robustness score of 0.24 at the selected time and the second run has a robustness score of 2. The scale of the plot is indicated by labels on the y-axis of 12 and −12. The robustness plot for the first run is shown by a line that almost overlaps with the x-axis, since the robustness score is relatively close to zero for the duration of the run. The plot of the second run, by contrast, starts at a high value, before falling below zero, and staying close to zero for the remainder of the run. For this example rule, the ego agent passed the rule for the duration of the first run, but for the second run, the robustness score falls below zero. The UI may be configured to display the corresponding part of the plot in red. In this example, the first run is the run for which the rule evaluation timelines are displayed, and so the rule evaluation timeline 508 for the ALKS_05 rule would be displayed as green throughout the run.

The user can click the time marker 410 and drag it along the timeline (referred to herein as 'scrubbing') to select a different time in the duration of the two runs to visualise. As the user moves the time marker, the visualisation of the agents in the road layout is updated to reflect the states of the respective agents at the selected time within the run. The time markers for the rule timelines and the robustness values 512 displayed alongside the rule timelines are also updated to reflect the selected time. The scrubbing mechanism can be applied to a run comparison view (as in FIG. 6) and also a single run view (as described above). The scrubbing mechanism is described in more detail above with reference to FIG. 9A. FIG. 9A shows a single run view, but the description applies equally to a run comparison view (where the user can scrub along vertically-stacked rule timelines pertaining to multiple runs).

The user can therefore compare the behaviour of the ego agents in different runs as the run progresses to understand why the behaviour deviates and to inform future tests. For example, where the parameters are the same between the two runs, but the comparison is between runs of two different versions of the ego stack, and where a given rule, for example a stable lateral position rule has failed on the updated version of the stack, the user can review the position of the ego in the run corresponding to the updated stack and determine the nature of the error in the ego's lateral position and attempt to identify causes for it. As mentioned above, the two runs can easily be distinguished in the visualisation as the agents of the second run are displayed in a different colour to the agents in the first run. Alternatively some other means of visually identifying the agents of the respective runs may be used, for example a visual effect, such as lower opacity of the agents, or a label on or around the agents of a given run.

The run comparison interface may be used to evaluate changes made to the stack. For example, if the AV planner is updated to change how the ego vehicle behaves when pulling out of junctions, the previous version of the stack (before this change was implemented) and the current version can be compared based on corresponding runs for a scenario in which the ego vehicle pulls out, to identify any changes to the behaviour of the ego for the same scenario parameters. The new ego stack may also be evaluated for scenarios having different scenario parameters and these can be compared for the new version of the stack in order to identify how different scenario parameters affect the ego's decision to pull out since the change to the planner was implemented.

As mentioned above, in a typical use case of the run comparison interface, a user may identify from the comparison table 502 that a given rule passed for one run of the comparison but failed for the other. Assuming that both runs are selected, the user can then deselect the check box associated with the run for which the given rule passed, and determine based on the rule timeline for the failed run the approximate point at which the failure occurred. The user can then move the time marker close to the point at which the ego agent failed the rule to view a playback of the ego's behaviour near the time of the failure. Then, to compare with the ego's behaviour in the other run, the check box corresponding to the passing run can be reselected, and the scenario can be played back to show how the behaviour of the ego agent differed between the two runs.

The above description relates to the use of the comparison tool for behavioural rules, but the user interface can also include perception rules as described earlier, where the perception of the vehicle (either simulated, for example using a perception error model, or real detections generated by an autonomous vehicle in real-time), is evaluated against a ground truth. For example, where a change is made to the perception system and the same scenario is re-run, if the ego agent fails a collision rule by colliding with a vehicle in front, but it passed this rule for the previous version of the stack, the user may replay the two runs in the same visualisation and determine that a failure in detecting the agent in front in sufficient time has caused the collision, and the user can review the most recent change to the perception stack to determine how the regression occurred.

In a regression comparison use case, one or more test suites, each defining a set of scenarios, are run for two different versions of the ego stack. Typically each test suite contains a large number of scenario instances (e.g. tens of thousands or more), with the vast majority of results being the same from one stack version to another. It is intractable for a user to manually review these results to identify rules for which the two versions differed.

Instead, an aggregation may be performed that runs the two test suites and identifies and reports only those rules for each scenario that yielded different results between two stack versions.

An interface showing the results of such an aggregation is shown in FIG. 7. This regression report interface may be provided as an additional display within a testing tool also comprising the run comparison visualisation described earlier. The report comprises a Test Results column, which identifies the test suite comparison 702, where, as described above, each test suite defines a set of scenario parameters and a ruleset. For each test suite of the comparison, a pair of IDs 704 are displayed, each ID 704 identifying a separate run of that test suite. For the given test suite regression comparison, each rule 706 for which regressions are found is displayed in the second column, and a summary 708 of improvements and regressions for that rule is displayed in the third column. Details of each individual regression and improvement is shown in the rows below, wherein the scenario name 710 is identified in the second column and result 712 is shown identifying the two runs of that scenario that differed, and the result for each run. In the example shown, the runs for the current version of the stack are shown first and the runs for the previous version of the stack are shown in brackets afterwards. In this example, for the given 'STAY_IN_LANE_JCTN' rule, 5 improvements and 1 regression was found. The first listed scenario is the regression, where the run corresponding to the current stack version resulted in failure and the previous stack version resulted in a pass. The remaining five results show the current version of the stack passing where the previous version of the stack passed. A 'compare' link 714 is provided for each improvement and regression, and when the user clicks on this link, this directs the user to the run comparison interface described above with reference to FIGS. 5-6, with the corresponding instance IDs identifying the first and second run data for rendering in the run comparison interface.

As mentioned above, the evaluation results may be stored in a results database, which may be accessed by the graphical user interface described above to display the plots of the numerical performance scores.

References herein to components, functions, modules and the like, denote functional components of a computer system which may be implemented at the hardware level in various ways. A computer system comprises execution hardware which may be configured to execute the method/algorithmic steps disclosed herein and/or to implement a model trained using the present techniques. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Examples of suitable programmable processors include general purpose processors based on an instruction set architecture, such as CPUs, GPUs/accelerator processors etc. Such general-purpose processors typically execute computer readable instructions held in memory coupled to or internal to the processor and carry out the relevant steps in accordance with those instructions. Other forms of programmable processors include field programmable gate arrays (FPGAs) having a circuit configuration programmable through circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like). The subsystems 102-108 of the runtime stack FIG. 1A may be implemented in programmable or dedicated processor(s), or a combination of both, on-board a vehicle or in an off-board computer system in the context of testing and the like. The components of FIGS. 2A, 2B, 3B, 4 and 8 may be similarly implemented in programmable and/or dedicated hardware.

The invention claimed is:

1. A computer system for rendering a graphical user interface for visualising runs of a driving scenario in which an ego agent navigates a road layout, the computer system comprising:
    at least one memory storing computer-readable instructions; and
    at least one processor coupled to the at least one memory and configured to execute the computer-readable instructions, which upon execution cause the at least one processor to:
    receive a map of the road layout of the driving scenario and run data of a run of the driving scenario, wherein the run data comprises:
        a sequence of timestamped ego agent states, and
        a time-varying numerical score quantifying performance of the ego agent with respect to each rule of a set of run evaluation rules, computed by applying the run evaluation rule to the run; and
    generate rendering data for causing a graphical user interface to display:
        for each rule of the run evaluation rules:
            a plot of the time-varying numerical score, and
            a marker denoting a selected time index on a time axis of the plot, the marker being movable along the time axis via user input at the graphical user interface to change the selected time index, and
            a scenario visualization comprising a visualization of the road layout, overlaid with an agent visualization of the run at the selected time index, whereby moving the marker along the time axis causes the at least one processor to update the scenario visualisation as the selected time index is changed.

2. The computer system of claim 1, wherein the run is a first run, and wherein the at least one processor is further configured to receive second run data of a second run of the driving scenario, the second run data comprising a second sequence of timestamped ego agent states and a second time-varying numerical score quantifying a performance of the ego agent with respect to each rule of a set of run evaluation rules, computed by applying the run evaluation rule to the run; and wherein the at least one processor is further configured to generate rendering data for causing a graphical interface to display, for each rule of the set of run evaluation rules:
    a plot of the second time-varying numerical score, wherein the time-varying numerical score and the second time-varying numerical score are plotted with respect to a common set of axes comprising at least a common time axis, wherein the marker denotes a selected time index on the common time axis, and
    a second agent visualisation of the second run at the selected time index, wherein the scenario visualisation is overlaid with the second agent visualisation.

3. The computer system of claim 1, wherein the time-varying numerical score is computed by applying one or more rules to time-varying signals extracted from the run data, and wherein changes in the signals are visible in the scenario visualisation.

4. The computer system of claim 2, wherein the at least one processor is configured, responsive to a deselection input at the graphic user interface denoting one of the first and second runs, to:
    for each driving rule, remove the plot of the time-varying numerical score of the deselected run from the common set of axes, and
    remove the agent visualization of the deselected run from the visualization of the road layout,
    whereby a user can switch from a run-comparison view pertaining to both of the first and second runs to a single-run view pertaining to only one of the first and second runs.

5. The computer system of claim 2, wherein the graphical user interface additionally includes a comparison table having an entry for each rule of the set of run evaluation rules, the entry containing an aggregate performance result for that rule in the first run and an aggregate performance result for that rule in the second run.

6. The computer system of claim 5, wherein the entry for each rule additionally comprises a description of that rule.

7. The computer system of claim 1, wherein the at least one processor is configured to, in response to an expansion input at the graphical user interface, hide the plot of the time-varying numerical scores for each rule and display a timeline view comprising an indication of a pass/fail result of the rule over time.

8. The computer system of claim 1, wherein the at least one processor is configured to cause the graphical user interface to display, for each rule of the set of run evaluation rules, the numerical score at the selected time index.

9. The computer system of claim 1, wherein the run evaluation rules comprise perception rules and wherein the scenario visualisation comprises a set of perception outputs generated by a perception component of the ego agent.

10. The computer system of claim 9, wherein the scenario visualisation comprises sensor data overlaid on the visualisation of the road layout.

11. The computer system of claim 1, wherein the scenario visualisation comprises a scenario time line having a scenario time marker, whereby moving the marker along the scenario time line causes the at least one processor to update the respective time marker of each plot of the time-varying numerical score as the selected time index is changed.

12. The computer system of claim 11, wherein the scenario time line comprises a frame index corresponding to the selected time index and a set of controls to move forwards or backwards by respectively incrementing or decreasing the frame index.

13. The computer system of claim 1, wherein the driving scenario is a simulated driving scenario in which a simulated ego agent navigates a simulated road layout, and wherein the run data is received from a simulator.

14. The computer system of claim 1, wherein the driving scenario is a real-world driving scenario in which an ego agent navigates a real-world road layout, and wherein the run data is computed based on data generated on board the ego agent during the run.

15. The computer system of claim 1, wherein the plot of the time-varying numerical score comprises an xy-plot of the time-varying numerical score.

16. The computer system of claim 1, wherein the time-varying numerical score is plotted using colour coding.

17. A method for visualising runs of a driving scenario in which an ego agent navigates a road layout, the method comprising:

receiving a map of the road layout of the driving scenario and run data of a run of the driving scenario, wherein the run data comprises:
  a sequence of timestamped ego agent states,
  a time-varying numerical score quantifying performance of the ego agent with respect to each rule of a set of run evaluation rules, computed by applying the run evaluation rule to the run,
generate rendering data for causing a graphical user interface to display:
  for each rule of the run evaluation rules:
    a plot of the time-varying numerical score, and
    a marker denoting a selected time index on a time axis of the plot, the marker being movable along the time axis via user input at the graphical user interface to change the selected time index, and
  a scenario visualization comprising a visualization of the road layout, overlaid with an agent visualization of the run at the selected time index, whereby moving the marker along the time axis causes an update to the scenario visualization as the selected time index is changed.

18. A non-transitory computer readable medium embodying computer program instructions, the computer program instructions configured so as, when executed on one or more hardware processors, to implement operations comprising:
  receiving a map of a road layout of a driving scenario and run data of a run of the driving scenario, wherein the run data comprises:
    a sequence of timestamped ego agent states,
    a time-varying numerical score quantifying performance of the ego agent with respect to each rule of a set of run evaluation rules, computed by applying the run evaluation rule to the run,
  generate rendering data for causing a graphical user interface to display:
    for each rule of the run evaluation rules:
      a plot of the time-varying numerical score, and
      a marker denoting a selected time index on a time axis of the plot, the marker being movable along the time axis via user input at the graphical user interface to change the selected time index, and
    a scenario visualization comprising a visualization of the road layout, overlaid with an agent visualization of the run at the selected time index, whereby moving the marker along the time axis causes the computer program instructions to update the scenario visualization as the selected time index is changed.

19. The non-transitory computer readable medium of claim 18, wherein the computer program instructions are further configured, when executed on the one or more hardware processors, to receive second run data of a second run of the driving scenario, the second run data comprising a second sequence of timestamped ego agent states and a second time-varying numerical score quantifying a performance of the ego agent with respect to each rule of a set of run evaluation rules, computed by applying the run evaluation rule to the run; and wherein the computer program instructions are further configured to generate rendering data for causing a graphical interface to display, for each rule of the set of run evaluation rules:
  a plot of the second time-varying numerical score, wherein the time-varying numerical score and the second time-varying numerical score are plotted with respect to a common set of axes comprising at least a common time axis, wherein the marker denotes a selected time index on the common time axis, and
  a second agent visualisation of the second run at the selected time index, wherein the scenario visualisation is overlaid with the second agent visualisation.

20. The non-transitory computer readable medium of claim 18, wherein the time-varying numerical score is computed by applying one or more rules to time-varying signals extracted from the run data, and wherein changes in the signals are visible in the scenario visualization.

* * * * *